(Model.)

13 Sheets—Sheet 1.

J. S. DAVIS.
GRAIN BINDING HARVESTER.

No. 417,473. Patented Dec. 17, 1889.

Fig. I.

Witnesses
Geo. W. Young.
Henry A. Lamb.

Inventor
John S. Davis
By his Attorneys
Jannus and Sinkle (Model.) 13 Sheets—Sheet 3.
J. S. DAVIS.
GRAIN BINDING HARVESTER.

No. 417,473. Patented Dec. 17, 1889.

Witnesses
Geo. W. Young
Henry A. Lamb

Inventor
John S. Davis.
By his Attorneys (Model.)

J. S. DAVIS.
GRAIN BINDING HARVESTER.

No. 417,473. Patented Dec. 17, 1889.

13 Sheets—Sheet 9.

Witnesses
Geo W Young
Henry A Lamb

Inventor
John S Davis
By his Attorneys

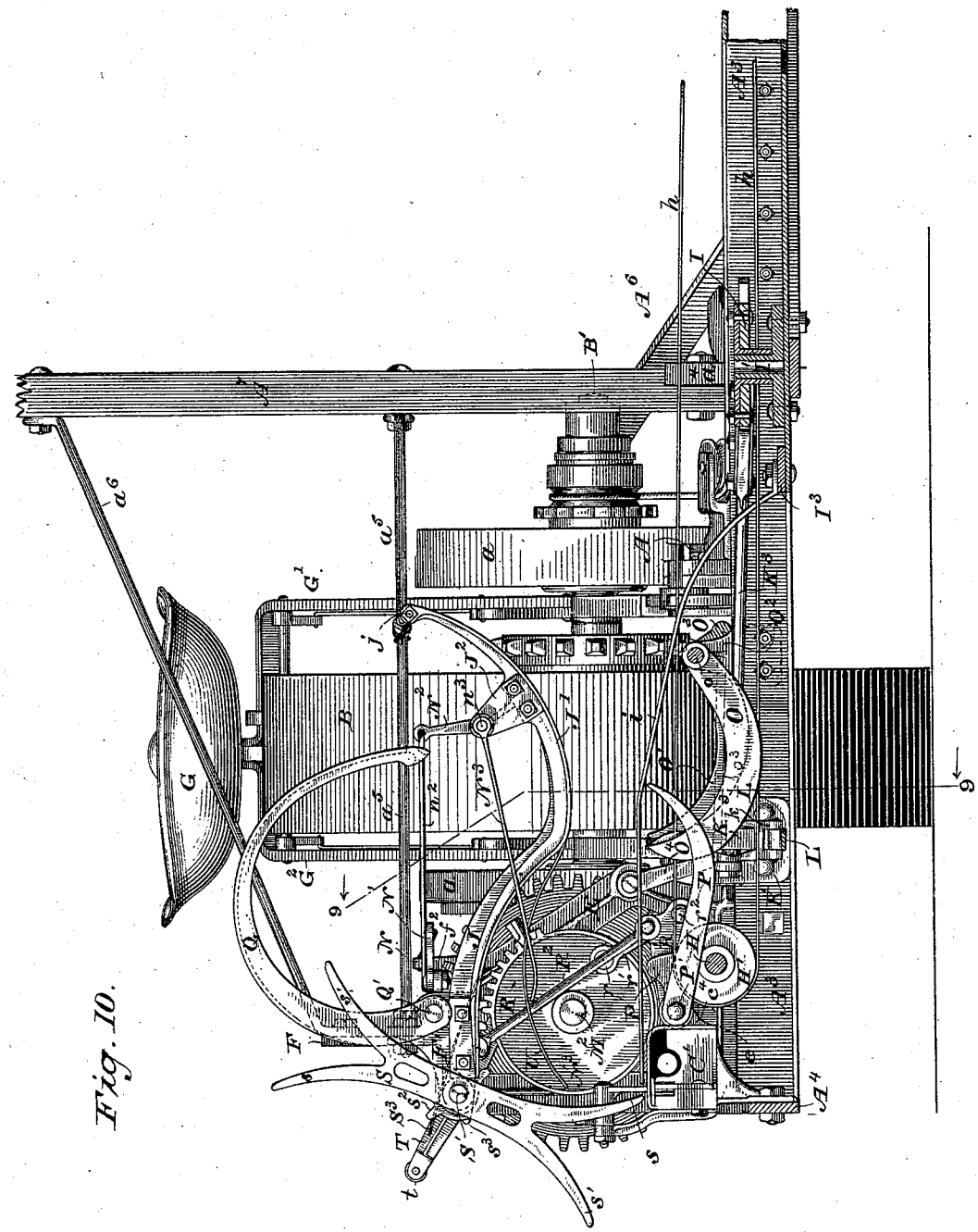

(Model.)
J. S. DAVIS.
GRAIN BINDING HARVESTER.
No. 417,473.  Patented Dec. 17, 1889.
13 Sheets—Sheet 11.
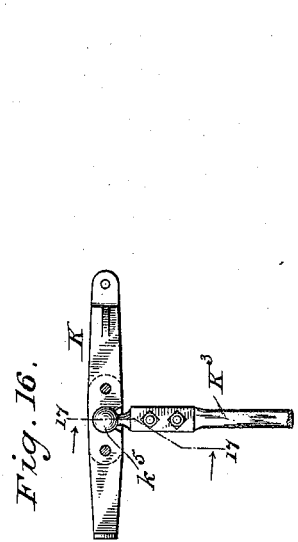
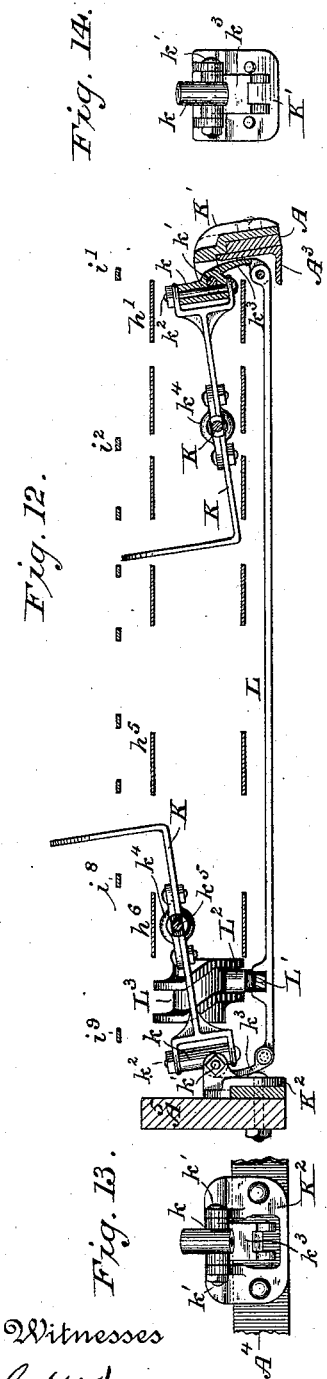
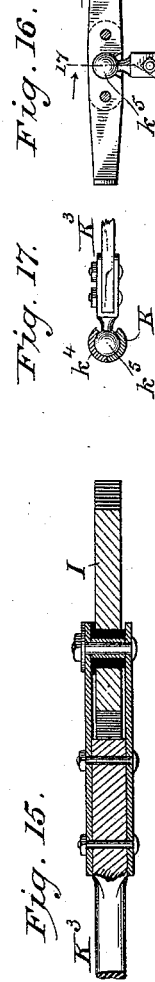
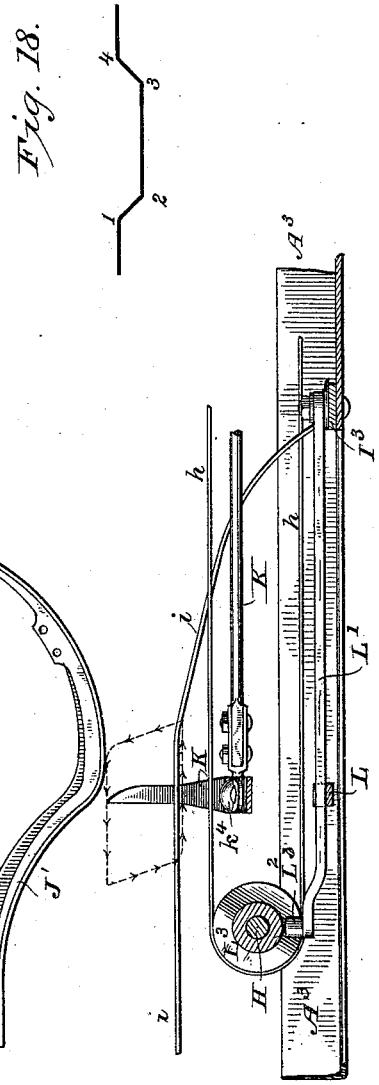
Witnesses
Geo. W. Young.
Henry A. Lamb.
Inventor
John S. Davis
By his Attorneys (Model.)
13 Sheets—Sheet 12.
J. S. DAVIS.
GRAIN BINDING HARVESTER.
No. 417,473.
Patented Dec. 17, 1889.
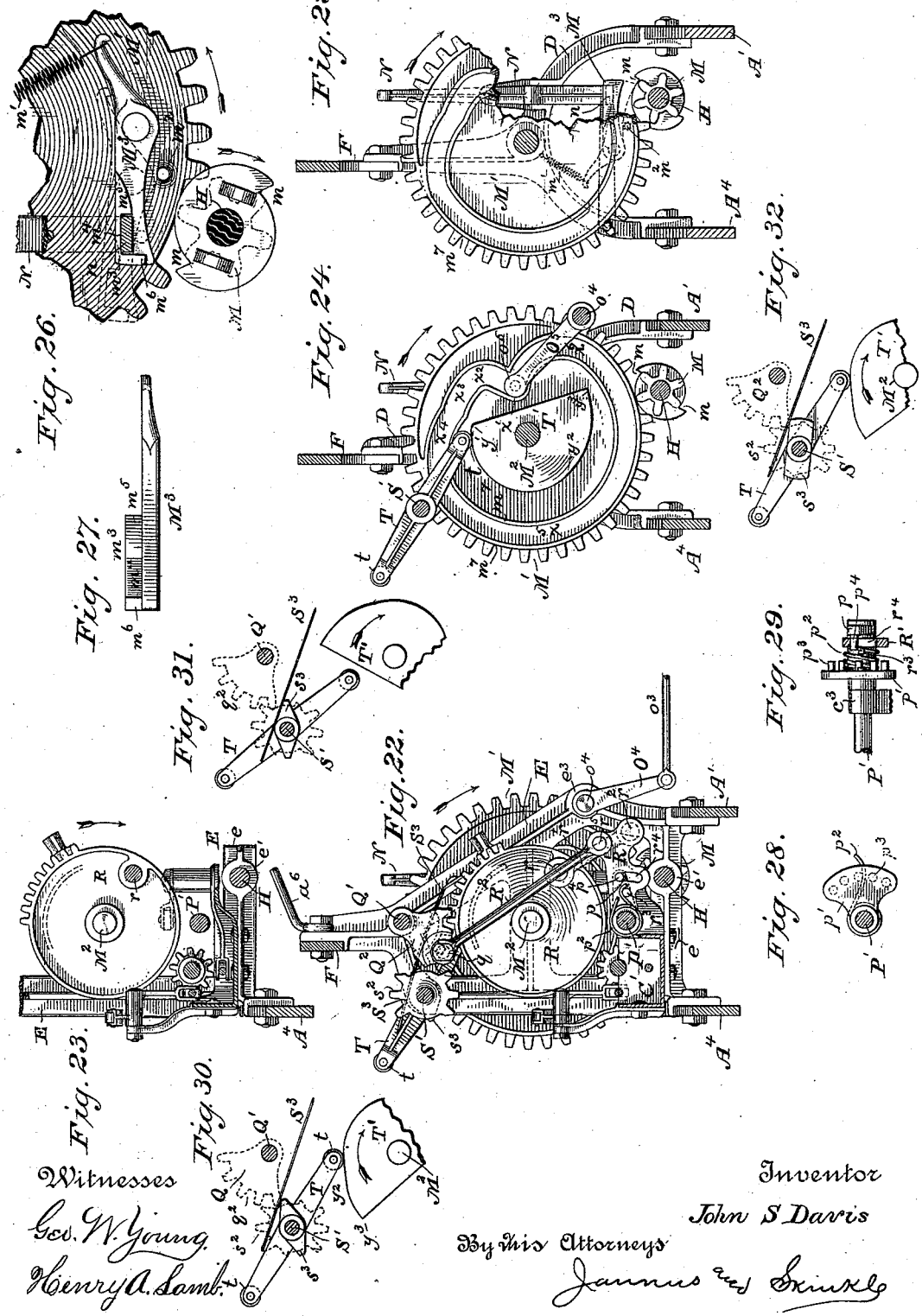
Witnesses
Geo. W. Young
Henry A. Lamb
Inventor
John S. Davis
By his Attorneys (Model.)
J. S. DAVIS.
GRAIN BINDING HARVESTER.
No. 417,473. Patented Dec. 17, 1889.
13 Sheets—Sheet 13.
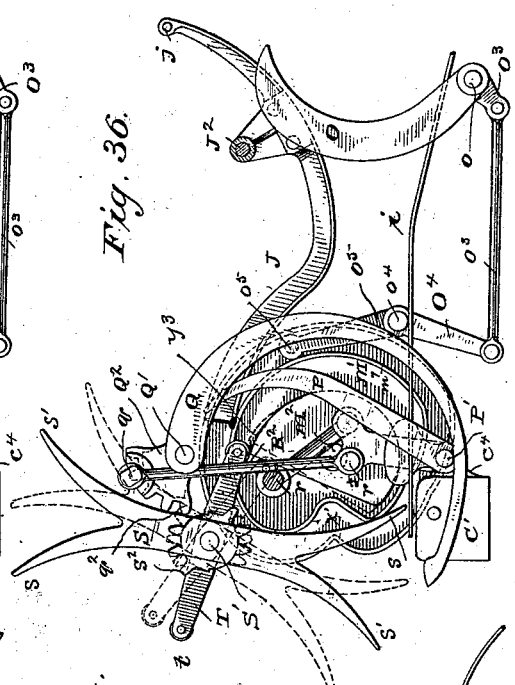
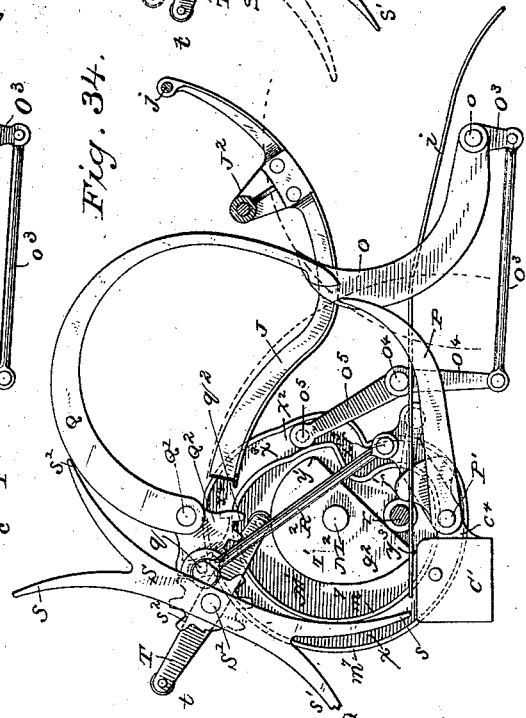
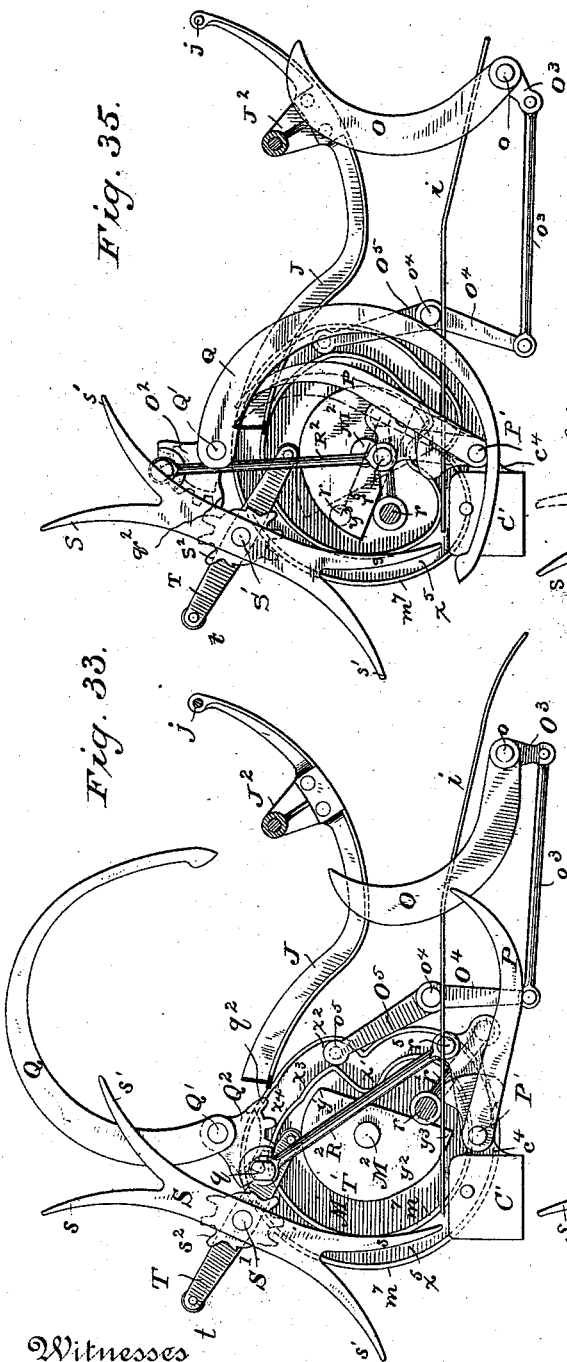
Witnesses
Geo. W. Young
Henry A. Lamb
Inventor
John S. Davis
By his Attorneys

UNITED STATES PATENT OFFICE.

JOHN S. DAVIS, OF TOLEDO, ASSIGNOR TO ADIEN E. SUMNER, OF CLEVELAND, OHIO.

GRAIN-BINDING HARVESTER.

SPECIFICATION forming part of Letters Patent No. 417,473, dated December 17, 1889.

Application filed May 27, 1885. Serial No. 166,849. (Model.)

*To all whom it may concern:*

Be it known that I, JOHN S. DAVIS, a citizen of the United States, residing at Toledo, in the county of Lucas and State of Ohio, have invented certain new and useful Improvements in Grain-Binding Harvesters, of which the following is a specification, reference being had to the accompanying drawings.

My invention has for its object the improvement of grain-binding harvesters of the class known as "platform-binders," in which the grain is gaveled and bound on or substantially on the level of the platform in rear of the main wheel.

It relates to the construction of the gaveling and binding mechanism and its location on a harvester-frame especially adapted to carry it, the said harvester-frame, however, being the subject of another application for a patent, which was filed by me March 7, 1885, renewed July 5, 1887, and patented August 28, 1888, No. 388,765.

The accompanying drawings represent my improvements and their application in the best form now known to me. Some of them, however, may be used without others and in machines differing in some respects from that shown and hereinafter particularly described, and the details of construction may be modified in various ways without departing from the spirit of my invention.

Figure 1:
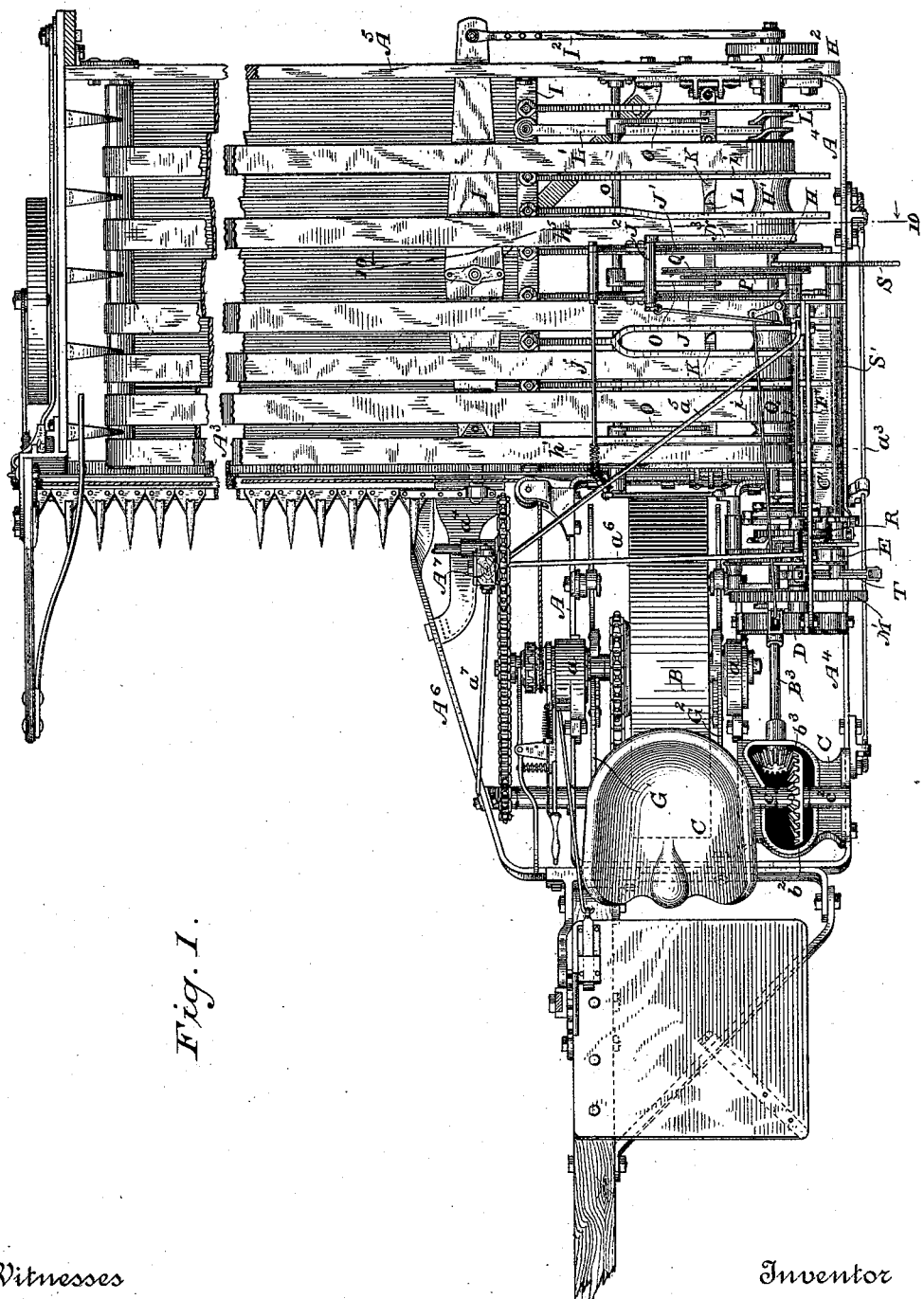
Figure 2:
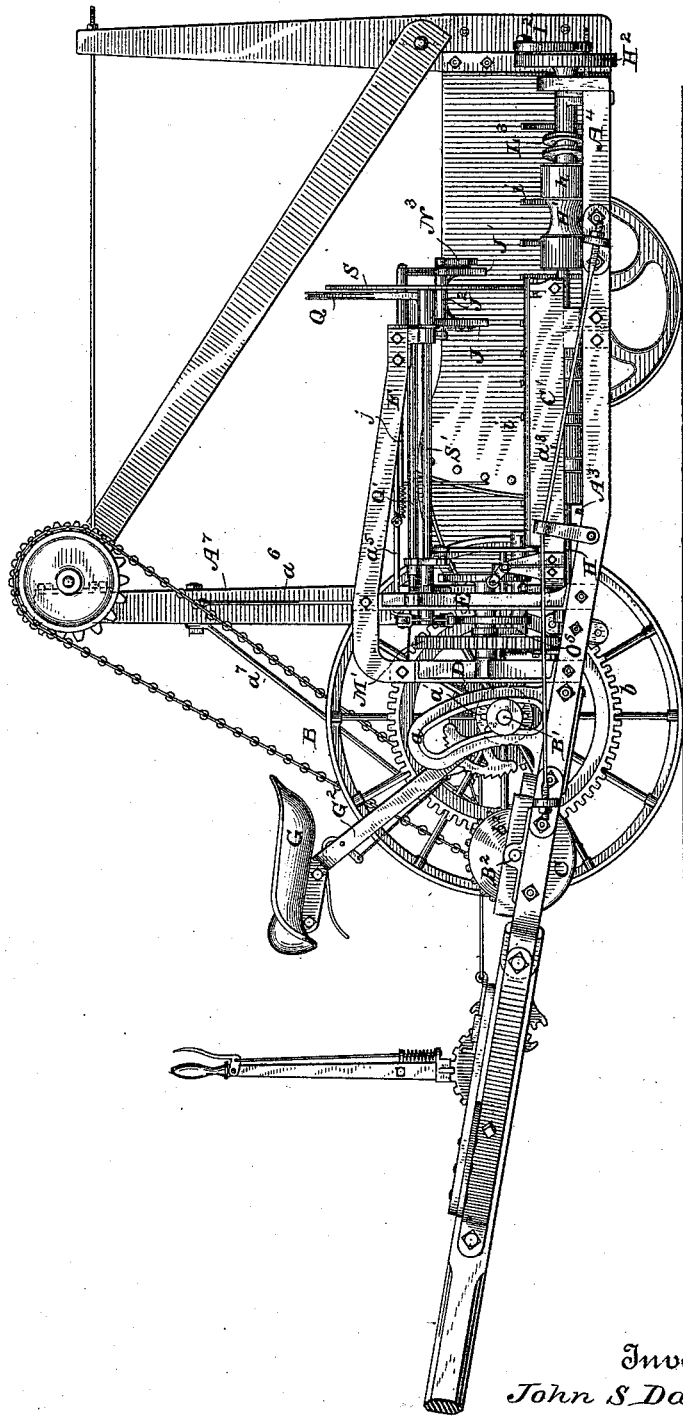
Figure 3:
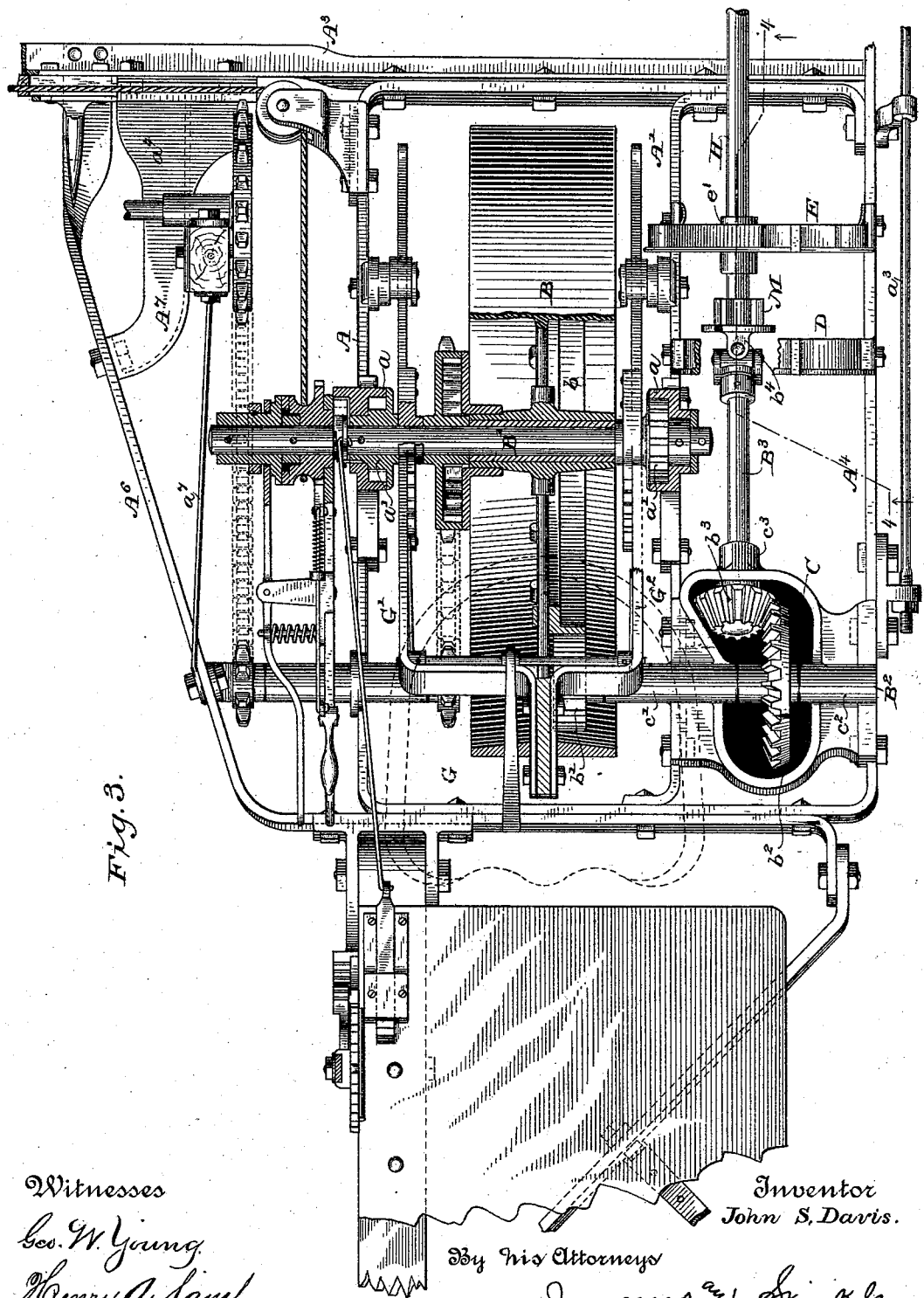
Figure 4:
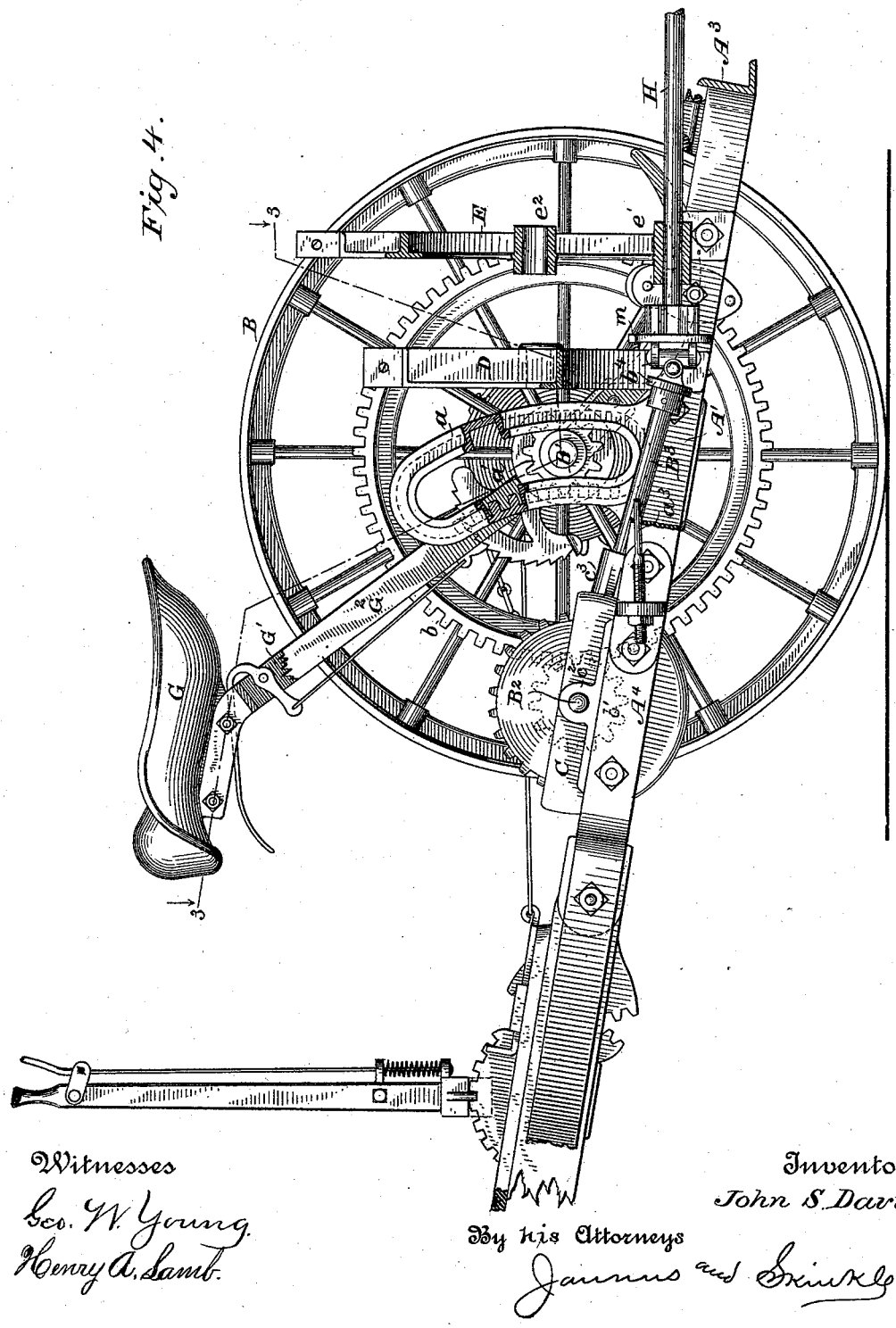
Figure 5:
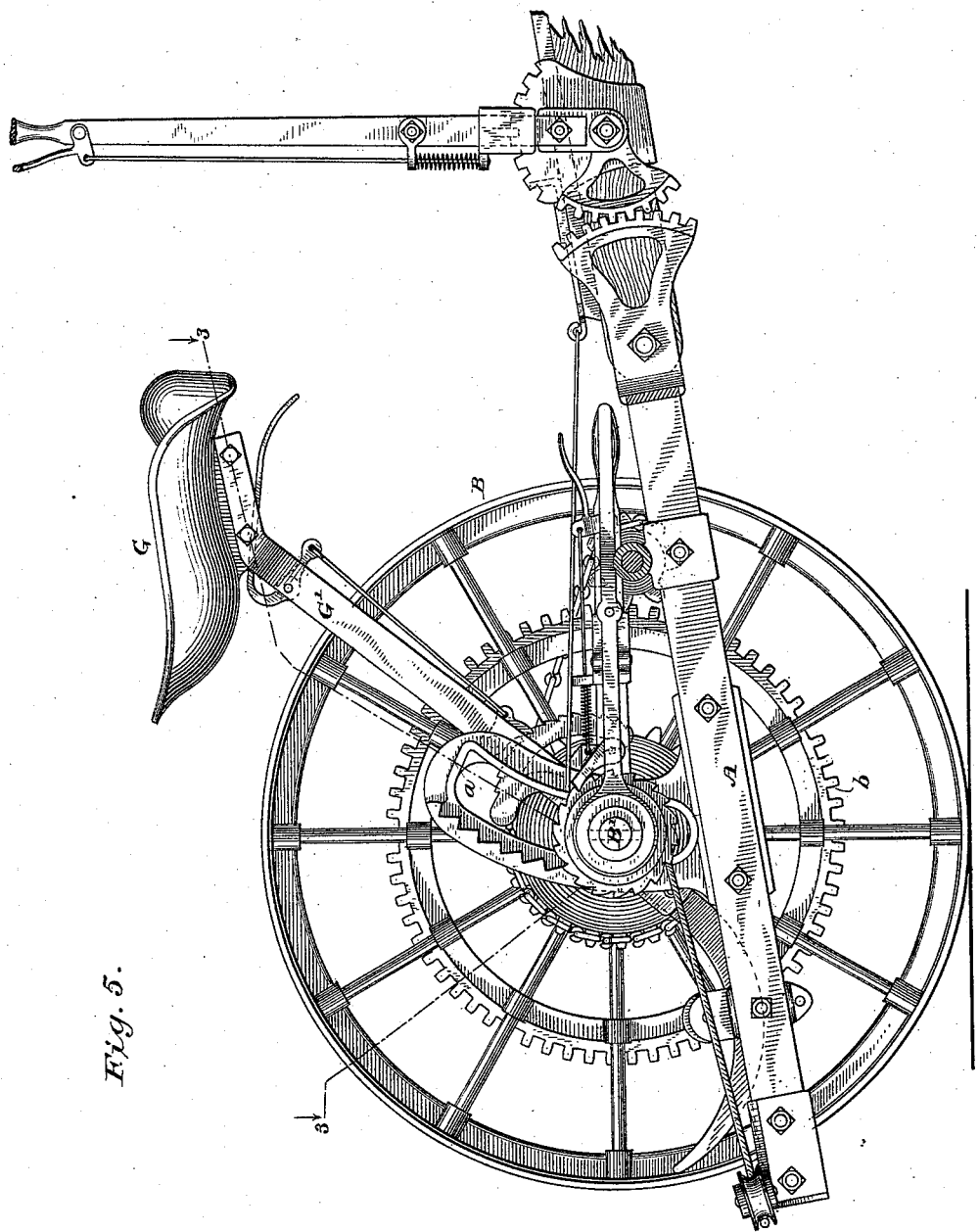
Figure 6:
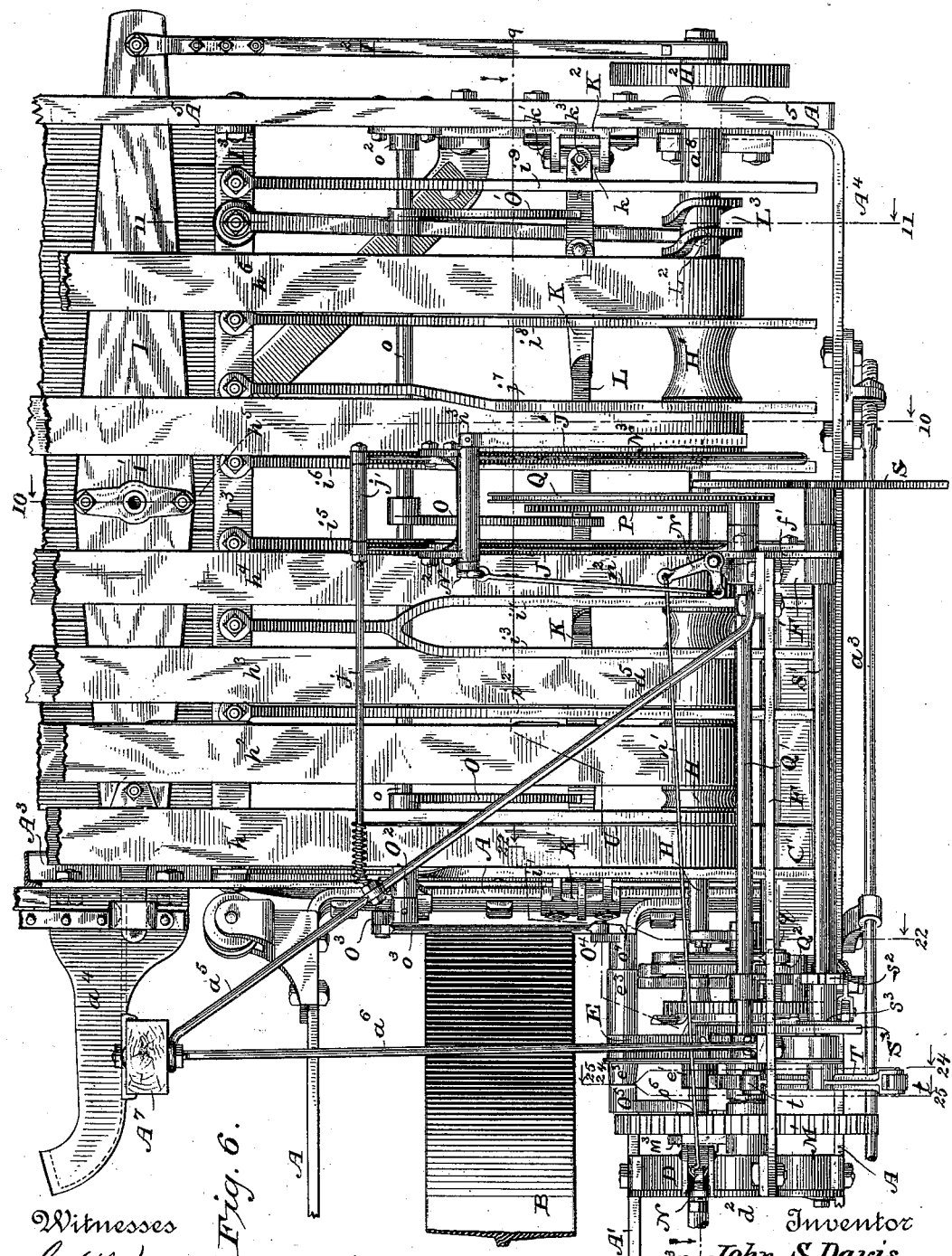
Figure 7:
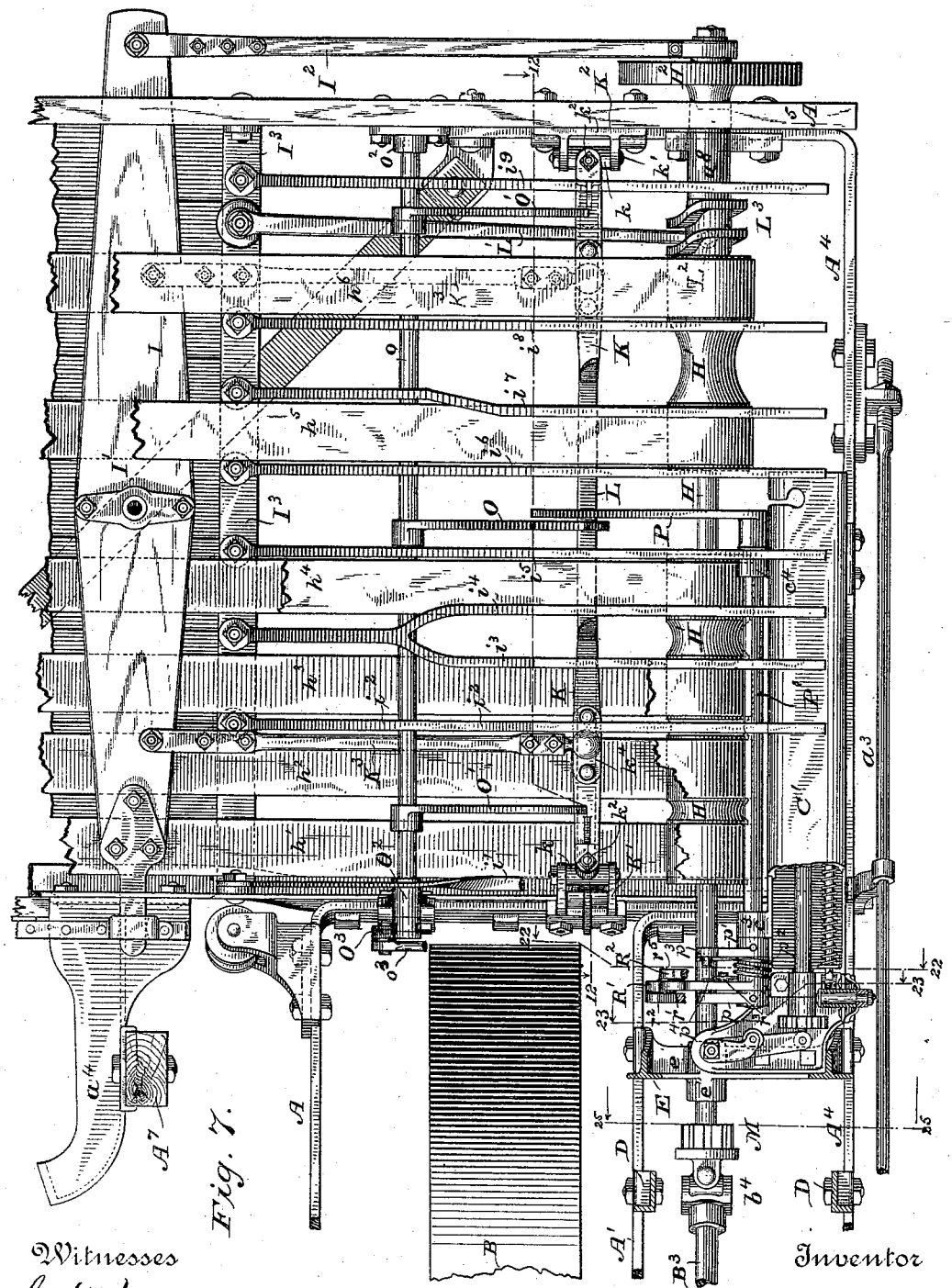
Figure 8:
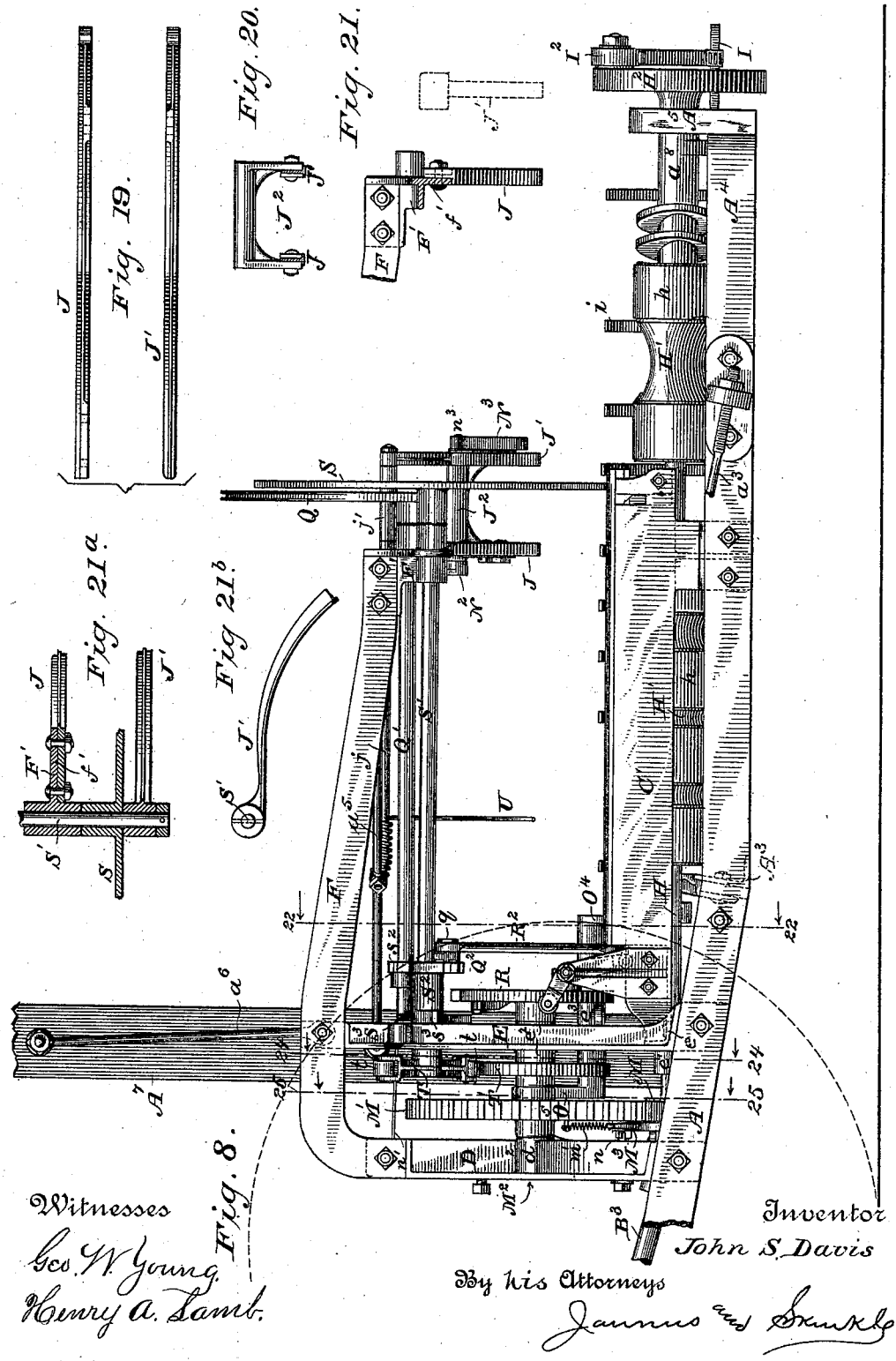
Figure 9:
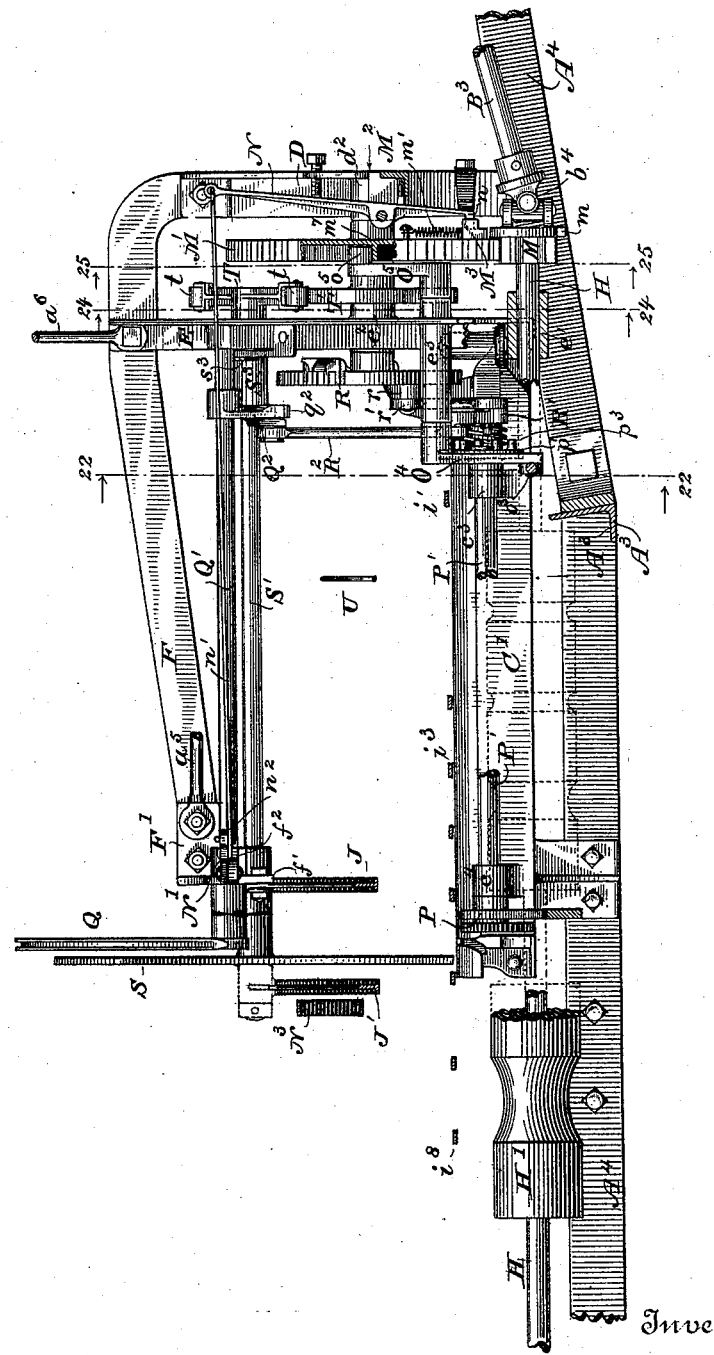

Figure 1 is a general plan view of my improved harvester-frame, showing the gaveling and binding mechanism suitably applied thereto. Fig. 2 is a side elevation of the frame as seen from the stubble side of the machine. Fig. 3 is an enlarged plan view, partly in section, on the lines 3 3 of Figs. 4 and 5, of the main portion of a harvester-frame immediately surrounding the driving-wheel. Fig. 4 is an outside elevation of the same, partly in section, on the line 4 4 of Fig. 3, with some of the parts broken away for the purpose of better illustration. Fig. 5 is an elevation of the same as seen from the grain side. Fig. 6 is a plan view of the stubble end of the grain-platform with the binding mechanism mounted thereon. Fig. 7 is a similar view of the same with some of the upper portions of the binding mechanism removed and some parts broken away to better illustrate a lower plane than that shown in Fig. 6. Fig. 8 is an outside elevation of the platform and binding mechanism. Fig. 9 is an inside elevation of the same, partly in section, on the lines 9 9 of Figs. 6 and 10. Fig. 10 is a rear view, partly in elevation and partly in section, on the lines 10 10 of Figs. 1 and 6, showing the binding mechanism, main frame, &c., in their normal positions. Fig. 11 is a sectional elevation on the line 11 11 of Fig. 6, showing the path of motion of the packer-arm at the entrance or throat of and into the binding-receptacle. Fig. 12 is a view in transverse section across the grain-platform on the line 12 12 of Fig. 7, showing the details of the packer-arms and their positions relatively to the carrier-belts and the bottom bars of the binding-receptacle. Fig. 13 is a view in elevation of the supporting-bracket and universal joint upon which the rear packer-arm is pivoted. Fig. 14 is a similar view of the bracket and joint for the front packer-arm. Fig. 15 is a detail view showing the manner of connecting the pitmen which actuate the packers to the sway-bar. Fig. 16 illustrates the ball-and-socket connection of one of the pitmen to its packer-arm, the removable cap or cover forming the upper part of the socket being removed. Fig. 17 is a detail view of the same, partly in section, on the line 17 17 of Fig. 16. Fig. 18 is a diagram view of the cam-track on the roller which raises and lowers the points of the packer-arms. Fig. 19 is a plan or top view of the bars of the breast-frame which forms the top of the binding-receptacle. Fig. 20 is a detail view of the bridge-piece by which the bars are united, the bars being shown in cross-section. Fig. 21 is a detail view, partly in section, illustrating the manner of connecting the front bar to the supporting-casting at the rear end of the overhanging arm on the binder-frame. Figs. 21ª and 21ᵇ illustrate a method of supporting the outer end of the rear bar of the breast-frame. Fig. 22 is a view, partly in rear elevation and partly in section, on the lines 22 22 of Figs. 6, 7, 8, and 9, of the cams and actuating mechanism of the binder and knotter;

Fig. 23, a similar view in section on the line 23 23 of Fig. 7. Figs. 24 and 25 are similar detailed sectional views on the lines 24 24 and 25 25, respectively, of Figs. 6, 7, 8, and 9. Fig. 26 is a view, partly in elevation and partly in section, of the front face of the driving-pinion and binder-wheel, showing details of the starting pawl or latch; Fig. 27, a bottom plan view of the pawl detached. Figs. 28 and 29 are detail views of the quadrant and spring through which pressure of the compressor-arm on the bundle may be varied. Fig. 30 is a detail view of the spring and cam for holding the retainer-arm in its working position; Fig. 31, a similar view of the same at a subsequent stage of the operation; Fig. 32, a similar view to Fig. 30, showing a modified form of cam. Figs. 33, 34, 35, and 36 are views of the binding mechanism similar to Fig. 10, but showing the relative position of the cut-off, needle, compressor, and ejector arms, and their actuating devices at several successive stages of the binding operation.

The main frame A of the harvester is composed of flat bar-iron bent to form a rectangle, the space within which is divided by a longitudinal brace-bar A'. The driving-wheel B is located in the inner one of the two compartments thus formed and supports the frame upon its axle B' by means of yoked standards $a$, attached to the adjacent frame-bars, the frame being sustained and vertically adjustable on the axle by means of geared racks in the yokes, into which take pinions $a'$, keyed fast to the axle, as clearly set forth in the before-mentioned harvester, application No. 158,037. An angle-iron bar $A^3$, composing the finger-beam and front sill of the grain-platform, is twisted at a point near its junction with the main frame to bring its front upright face to an angle that will conform to the angle of the main frame, against the back bar of which it is securely bolted, as shown. The outer side bar $A^4$ of the main frame is slightly bent edgewise near its point of connection to the rear bar of the frame and extends horizontally across the outer end of the platform to the rear sill $A^5$ thereof, to which it is securely attached, and to prevent its sagging under the weight of the binding mechanism and platform I employ a truss-brace $a^3$, as shown, to stiffen or strengthen it. A diagonal brace-bar $A^6$ extends from near the front inner corner of the main frame to the finger-beam, to which it is rigidly attached at a point about in line with the first guard-finger, while a casting or shoe $a^4$, secured to the finger-beam between the brace-bar and the main frame, extends forward and is curved to meet the brace-bar $A^6$, to which it is also bolted. A flanged step on this casting receives the lower end of a reel-post $A^7$, which is held firmly in place on the step by a bolt.

In the outer compartment of the main frame are located a bracket or gear-casing C and two standards or brackets D and E, which span the space between the bars $A'$ $A^4$ and are securely bolted to them. The standards D and E constitute the frame or main support of the binding mechanism and are united at their tops by an overhanging supporting-arm F, securely bolted to each standard and extending to a point above the grain-receptacle about midway across the platform. This arm consists of a flat bar of wrought iron or steel bent edgewise to the shape shown in Figs. 2, 8, and 9, and is sufficiently strong to sustain the weight of the binding mechanism imposed upon it. A brace-rod $a^5$ is attached to the reel-post $A^7$ and extends diagonally from it to the rearward extremity of the overhanging arm, bracing it against side movement. The reel-post is firmly held in its upright position by brace-rods $a^6$ $a^7$, the former attached to the head of the standard E and the latter to the main frame at any suitable point in advance of the post.

The driver's seat G is located in front of and over the driving-wheel and is sustained by a bifurcated seat standard or lever, the members or forks $G'$ $G^2$ of which are fulcrumed upon the axle at each side of the main wheel and pass at their lower extremities beneath resistance-points attached to the main frame in rear of the axle. By this construction the seat-standard is made to act as a lever and the driver's weight utilized to counterbalance the preponderance of the weight of the machine at the rear of the axle, enabling me to place the main wheel in front of the platform and yet maintain a proper balance of the machine upon the axle without the use of a trailing caster-wheel at the rear of the platform.

Knot-tying mechanism, which forms the subject of another application for a patent filed by me, is inclosed in a box or casing C', which, constituting part of the binding-receptacle and affording support to some of the operative parts of the binding mechanism, is a necessary feature of this application. At the rear end of the knotter-box is a downwardly-projecting foot suitably ribbed to give it the requisite strength and securely bolted to the extension-bar $A^4$, while at its forward end the box rests upon and is bolted to a cross-bar $e$ of the standard E. (See Figs. 7, 8, 19, 22, and 23.) A driving-shaft $B^2$ revolves in overhanging sleeve-bearings $c'$ $c^2$, cast to the gear-box C. At the inner end of this shaft is mounted a spur-pinion $b'$, driven by a spur-gear wheel $b$, cast within or attached to the driving-wheel B. A beveled wheel $b^2$ is keyed to the shaft between the sleeve-bearings and engages a beveled pinion $b^3$, supported on the end of a shaft $B^3$, which is journaled at its forward end in a sleeve-bearing $c^3$, cast on the gear-box. This shaft extends backward and downward at an angle to a point beneath the standard D, where it is united by a universal joint $b^4$ to a shaft H, which extends horizontally back across the platform, and is supported in a bearing $e'$ on the standard E and in a bearing $a^8$ on the rear sill-bar. The bearing $a^8$ consists of a sleeve having an extending flange or foot piece, by which it is secured to the sill. At suitable intervals along the shaft are rollers H′, by which the platform-carrier belts $h'$ to $h^6$ are driven. The shaft extends through the bearing $a^8$ and carries at its rear projecting end a crank-disk H². A sway-bar I is suitably pivoted near its center I′ to the bottom of the platform. It lies between the upper and lower surfaces of the carrier-belts and projects at its extremities through the front and rear sills, being connected at its front end to the cutter-bar and at its rear end by a pitman I² to the crank-disk H², by which it is vibrated.

The wooden flooring which constitutes the bottom of the platform consists of thin boards running lengthwise thereof and supported at their ends by transverse iron brace-bars I³, which extend across the platform and are secured by their upturned ends to the front and rear sills. These cross-bars extend across the platform below the lower surfaces of the carrier-belts, and to the outer one of them is secured a series of spring fingers or bars $i'$ to $i^9$, which constitute the bottom bars of the binding-receptacle. These spring-bars are bolted at their inner lower ends to the bar I³ and rise with an easy inclination in the spaces between the belts until a sufficient height above their upper surfaces is attained, when they extend in a plane above and parallel with the tops of the belts to the outer edge of the binding-receptacle. At their outer ends the spring-bars normally lie in a plane slightly above the top of the knotter-box C′, there being a small space between the cover of the box and those bars which extend over it. When the grain is being packed into the binding-receptacle and bound, the bars which extend over the box-cover are pressed down and rest upon it; but when the bound gavel is ejected from the receptacle and its weight removed from the bars they spring up from the cover and permit free exit of any straws which may have gotten beneath them or between them and the cover.

The spacing arrangement of the belts and spring receptacle-bars across the platform is such as to best adapt them to the performance of their own functions while permitting the operation of other parts of the binding mechanisms which move through or between them. The belt $h'$ lies close to the finger-beam, against the upright face of which is bolted the flat side of the first receptacle-bar $i'$, the inclined or rising portion of which presents its edge on top; but when the proper altitude above the belts is attained the bar is twisted to bring its flat side or broad surface on top. The front cut-off finger works in the narrow space between the belts $h'$ $h^2$, in which there is no spring receptacle-bar. A straight receptacle-bar $i^2$ lies between the belts $h^2$ $h^3$. The point of the front packer-arm works in the space between the belts $h^3$ $h^4$, and two receptacle-bars $i^3$ $i^4$ overlie the adjacent edges of the belts and are supported by a common stem which passes down between the belts.

At each side of a wide space between the belts $h^4$ $h^5$ are receptacle-bars $i^5$ $i^6$, between which the central cut-off, the compressor, the needle, and the retainer arms work. The point of the rear packer-arm moves in the space between the belts $h^5$ $h^6$, at each side of which are receptacle-bars $i^7$ $i^8$, the former being bent sidewise and overlying the edge of the belt $h^5$, in order to clear the point of the packer-arm.

Between the belt $h^6$ and the rear sill of the platform is the rear cut-off arm and the last receptacle-bar $i^9$. It will be seen by the drawings that the carrier-belts run through slots in the inclined or entrance portion and well under the bottom of the receptacle which lifts the straw from off the belts, freeing them entirely from it before they reach their driving-rollers. This prevents the pulling down by the belts and wrapping upon the driving-rollers of occasional or stray straws, the accumulation of which would necessitate the stoppage of the machine for their removal, a difficulty frequently experienced where the carriers terminate on a roller at the entrance to the receptacle. The top or breast of the binding-receptacle is formed by two bars J J′, sustained in position over the center of the receptacle by the overhanging arm of the binder-frame. A cast-metal bracket or supporting-head F′ is attached to the end of the arm F, and to a downwardly-projecting flange $f'$ on its rear face is securely bolted the heel or butt-end of the receptacle or breast bar J J′. The bars J J are T-shaped in cross-section to make them light and strong, the heads of the T's being turned down to present a broad surface, against which the grain may be tightly packed without being abraded or cut. From its point of attachment to the supporting-head the breast-bar extends inwardly and is curved down toward the bottom bars of the receptacle, approaching them most nearly at the point of angle between their inclined and horizontal surfaces, from whence it extends by an easy curve inward and upward until such an altitude is attained as will insure its always being above the incoming grain. As the bar recedes inwardly from its point of attachment to the supporting-head the rib on its top is tapered or gradually reduced in depth until it reaches the extreme inner end of the bar, where it merges into a perforated boss formed at the termination of the bottom flange.

A companion breast-bar J′ is supported by the bar J through a connecting bridge piece or bracket J², securely bolted to the latter on its inner upwardly-curved portion. The bridge consists of a cylindrical tube, which spans the space between the two breast-bars, and provided at each of its ends with downwardly-projecting flanges or feet, by which it is bolted to the bars with two bolts in each, as shown. The bridge is strengthened by corner brackets or ribs cast on the inner faces of the feet and extending along the connecting-tube, and the ribs on the upper faces of the bars are deepened and thickened opposite the bridge-feet to give them greater strength at this point. From its point of connection to the bridge the rib on the bar J' is tapered or gradually reduced in depth toward its outer free end, and with this exception the two bars are alike in general shape. At their inner ends the bars are united by a rod j, which passes through their perforated bosses, is surrounded by a spacing sleeve or thimble j' between the bars, and provided with clamping-nuts, which bear against the outer faces of the bars and clamp the whole structure rigidly together. At its front end the rod j extends from the breast-frame to the brace-rod $a^5$, and is bent to intersect it at a right angle, and, passing through an eye or perforation therein, is firmly secured by screw-nuts on each side of the eye. The rod j and spacing-thimble j' assist the bridge $J^2$ in maintaining the parallelism of the breast-bars, while the distant connection of the rod to the brace-bar $a^5$ stiffens the breast-frame against twisting strains and holds it firmly against either side motion or spring.

The outer end of the breast-bar J' opposite the point of attachment of the bar J to the overhanging arm may be left free or without support, as shown in most of the figures of the drawings. For all ordinary work with the design and proportions of the breast-frame shown this would fulfill all the requirements; but where an extraordinary compression of the bundles or any other condition making it desirable to have the end of the bar supported is called for it may be accomplished as shown in Figs. $21^a$ and $21^b$ and by dotted lines in Fig. 9, the bar terminating in a cylindrical boss or hub, which fits over the projecting end of the retainer-shaft S', and is held in place thereon by the retainer-arm and a collar pinned to the shaft, the shaft revolving freely in the boss. There is no point of the space in the breast-frame between the bridge-piece and the retainer-shaft that is not traversed by one or the other of the moving arms of the binding mechanism, and consequently it is not possible to support the end of the breast-bar J' by any fixed means directly from the supporting-head, as any fixture to accomplish this object would necessarily have to loop or bow around outside of the path of the arms and above the binding-receptacle. The tubular portion of the connecting-bridge is elevated above the bars in order to keep it above the path of the cut-off arm, which swings across the throat and moves between the bars above the plane of their bottoms, as shown by the several figures of the drawings.

The needle, cut-off, compressor, and ejector arms work within the space between the two breast-bars, as will hereinafter be explained.

As shown by the drawings, (see particularly Figs. 10 and 33 to 36,) the breast and bottom bars J and i of the binding-receptacle are so shaped and situated relatively to each other as to form at their inner ends a wide mouth for the reception of the incoming grain from the platform, which, as the bars approach each other, is gradually reduced to form a throat or narrow passage-way, terminating abruptly in the binding-receptacle. The grain is brought in from the platform by the carrier-belts and deposited upon the bottom receptacle-bars i immediately in front of the throat, being lifted off the belts by the inclined portion of the bars and accumulated within reach of the packing devices, which urge it through the throat and into the binding-receptacle. The packers consist of two or more pivoted arms K, which lie below the bottom of the receptacle and between the upper and lower surfaces of the carrier-belts. They are provided at their free swinging ends with upwardly-extending fingers, which project above the bottom of the receptacle and into the throat as the arms are vibrated outwardly, but are depressed below the bottom of the receptacle on the inward vibration of the arms. In the drawings two of these packer-arms are shown (see Figs. 6, 7, 10, and 12 to 17, inclusive) pivoted to brackets bolted to the front and rear sills of the platform.

The bracket K', supporting the front packer-arm, is attached outside of or upon the front face of the sill $A^3$, (or, rather, upon the rear bar of the main frame, which at this point lies against the sill,) and is provided with two ears, which extend over the sill and beyond its inner face. A knuckle or universal joint k is pivoted between these ears, upon a horizontal pin k', while the packer-arm is pivoted upon a pin $k^2$, which passes through the upright member of the knuckle, the arm being bifurcated and embracing the said member between its forks. An arm $k^3$ depends from the outer face of the horizontal member of the knuckle to a point below the lower surface of the belts, where it terminates in two ears or lugs, between which is pivoted a bar L, which connects the knuckles of the front and rear packers together, and which, being reciprocated, rocks the knuckles upon the horizontal pins and causes the points of the packer-arms to rise and fall through the bottom of the receptacle.

An inside face view of the bracket K' and knuckle-joint which supports the front packer-arm is shown in Fig. 14. The bracket is bolted upon the outer face of the sill to permit the carrier-belt h' to run close to the inner face thereof. The rear packer-arm is constructed and mounted precisely like the front one, except that the bracket $K^2$ (shown in Fig. 13) is slightly modified to adapt it to its position on the rear sill. Near its rear end the bar L has two lugs or projections on its upper surface, which are rounded on their adjacent faces and snugly embrace a lever L', which lies between them and is pivoted at its inner end to the bar I³. The lever terminates at its outer end beneath the driving-shaft H, and is provided with a stud or anti-friction roller L², which takes into the groove of a cam-roller L³ on the shaft, which in revolving imparts a vibrating motion to the lever whenever the stud runs through the inclined portions of the cam. These inclined portions of the cam-track 1 to 2 and 3 to 4 (see Fig. 18) are as short or abrupt as it is practical to make them consistent with easy working, in order to quickly vibrate the lever and elevate or depress the points of the packer-arms at the proper moments. Each packer-arm is connected by a pitman K³ to the sway-bar, by which it is vibrated horizontally back and forth on the pivot-pin $k^4$ of its knuckle-joint. About midway of its length a depression or recess is formed in the packer-arm and covered by a correspondingly-recessed cap $k^4$ to form a suitable socket for the reception of the ball-joint $k^5$ on the end of the pitman. (See Figs. 11, 12, 16, and 17.) The pitman is connected to the sway-bar by the noiseless yielding rubber sleeve-joint, (shown by enlarged detail, Fig. 15.) This forms a tight joint around the cross-pin, but permits the swaying movement of the pitman as it follows the wrist-pin of the crank.

It will be understood from the foregoing description that the packer-arms are vibrated horizontally by the sway-bar through the pitman-connections and vertically by the cam L³, acting through the lever L' and the bar L, which unites the two knuckle-joints. These two motions are so timed relatively to each other that the points of the packer-arms are caused to traverse the path shown by dotted lines in Fig. 11. At the beginning of the forward movement they rise very rapidly while advancing slowly, owing to the quick action of the cam L³ in raising them and to the slow motion of the sway-bar I when its actuating-pitman is on or just passing the dead-center of its driving-crank H². At the extremity of the advance stroke they fall below the bottom bars of the receptacle and return to the starting-point, having gone through, practically, four motions—viz., rising, advancing, falling, and receding. Of course the path of motion may be slightly modified or altered (advantageously, perhaps) from that shown without departing from the spirit of my invention, which consists, essentially, in placing the feeding or packing devices of a platform or low-down binder within the table and below the binding-receptacle, into the entrance to which they are thrust through aptures or slots in its bottom.

A grain retaining, compressing, and bundle-ejecting arm S forms the outer side of the binding-receptacle and arrests the grain being packed into it. This arm is mounted upon the end of an overhead shaft S', supported at its rear end in a bearing in the bracket or supporting-head F' and at its front end in a bearing on the standard E. The needle-arm Q is mounted upon an overhead shaft Q', parallel to the shaft S', and is also supported in bearings in the supporting-head F' and standard E. Cut-off arms O O' are mounted upon a shaft $o$, which extends across the platform below the receptacle-bars $i$ and between the upper and lower surfaces of the belts, and serve to check and throw back the incoming stream of grain when the receptacle is full and the binding operation about to take place.

A compressor-arm P is mounted upon a shaft P', supported in suitable bearings $c^3$ $c^4$, cast upon the knotter-box C'. This arm assists the cut-off arm in making a wide separation between the incoming stream of grain and the gavel, and, further, it compresses the gavel in advance of the needle-arm.

A float or starting bar N³ is pivoted to the bridge-piece J² of the breast-frame and projects into the binding-receptacle. As the grain is packed into the receptacle under it the float is gradually raised until it trips the starting mechanism, by which the binder is thrown into operation.

Motion is communicated to the binding mechanism by a spur-pinion M, keyed fast to the constantly-revolving driving-shaft H, engaging at proper intervals with the spur-wheel M', carried by a shaft M², having its bearings $d^2$ and $e^2$ in the standards D and E at each side of the wheel. The spur-wheel is mutilated, two of the teeth being omitted at the point nearest the driving-pinion when the wheel is at rest, the pinion revolving freely in the space thus formed. (See Figs. 6, 8, 9, and 24 to 27.) On the front end of the pinion is a projecting flange having two notches $m$ $m$ in its edge and carrying on its front face the two lugs, which form part of the universal joint, by which the shafts B³ and H are united. The flange lies in a plane in front of the face of the binder-wheel M', upon which is pivoted a starting-pawl M³, which, when the binder is to be operated, falls into one of the notches in the pinion-flange, causing the wheel to move forward until its teeth become engaged with those of the pinion, by which it is then moved through a complete revolution.

A trip-lever N, pivoted upon the standard D, has a toe or projection $n$ upon its lower end, which, when the binder is at rest, lies under the starting-pawl, holding it out of engagement with the pinion; but when the binder is to be operated the toe is withdrawn from under the pawl, permitting it to drop and engage the pinion. A spring N⁴, attached to the standard D, bears against the lower end of the trip-lever, urging it toward the binder-wheel, while an adjustable stop $n^4$ on the standard limits its movement in this direction. The pawl M³ is urged into engagement with the pinion by a spring $m'$, its downward movement being limited by a stop-lug $m^2$ on the face of the binder-wheel, on which it rests while the wheel is in motion; but at the completion of the revolution the pawl slides over the toe of the lever N, lying in its path, and is held by it above the reach of the pinion. The pawl is provided on its front face with a projecting ledge $m^3$, (see Figs. 26 and 27,) by which it is engaged by the toe $n$ of the trip-lever. On the under side of the ledge is a recess or pocket $m^4$, in which the toe $n$ lies when the wheel is at rest, locking it against accidental movement. An inclined portion of the ledge $m^5$ on the advanced side of the pocket rides over the toe $n$, lifting the pawl off the stop-lug, (see dotted lines, Fig. 26,) and a downward extension $m^6$ of the ledge strikes the toe and abruptly stops the binder-wheel at the completion of its revolution, the extension $m^6$ being long enough to insure contact with the toe and guard against the wheel overrunning. The trip-lever N is pivoted between supporting-ears on the standard D and rocks in a vertical plane at right angles to the face of the binder-wheel, its toe $n$ normally lying in the path of the starting-pawl $M^2$, but is withdrawn therefrom by rocking the lever on its pivot when the binder is to be operated. The upper end of the lever is connected by a link $n'$ to one arm of a bell-crank N', pivoted to a projecting lug $f^2$ on the supporting-head F' at the end of the overhanging arm. The other arm of the bell-crank is connected by a link $n^2$ to a lever $N^2$, secured upon one end of a rock-shaft $n^3$, mounted in the tubular portion of the bridge $J^2$ of the breast-frame, the float or starting bar $N^3$ being secured upon the other end of this shaft.

By reference to Figs. 1, 6, 9, 10, 25, and 26 the operating of the starting mechanism will be readily understood. The float $N^3$, being raised as the grain is packed into the binding-receptacle, communicates motion to the trip-lever N through the links, levers, &c., just described, rocking it upon its pivot until its toe is withdrawn from beneath the starting-pawl $M^3$, permitting it to drop into engagement with the pinion M and start the binder-wheel, at the completion of whose revolution the dog is again intercepted by the trip-lever and the wheel locked as before described. Suitable provision would of course be made for varying the size of the bundles by hastening or retarding the tripping action. The binding-wheel M' makes a complete revolution for each bundle bound and has two ribs $m^7$ $m^7$ cast upon its rear face to form a camway or track by which the movements of the cut-off arms O are governed. These arms are secured upon the shaft $o$, which has its bearings in brackets $O^2$ $o^2$, bolted, respectively, to the front and rear sills of the platform. A crank-arm $O^3$ is secured to the front end of the shaft and connected by a link $o^3$ to a similar crank-arm $O^4$ on the end of a rock-shaft $o^4$. This shaft is mounted in a long sleeve-bearing $e^3$, cast upon the standard E, and has secured to its front end a crank-arm $O^5$, that carries an anti-friction roller $o^5$, lying in the cam-track on the binder-wheel and deriving from it a variable motion, which it imparts to the cut-off arms. When the binder is at rest, as shown in Figs. 10 and 24, the roller lies in the pocket $x'$ of the cam-track and the cut-off fingers are below the bottom bars of the receptacle. On the first movement of the binder-wheel the roller runs up the quick incline of the cam to the point $x^2$, (see Fig. 33,) rapidly raising the cut-off arms, their points piercing and throwing back the stream of grain in the throat of the binding-receptacle and stopping above the breast-bars, thus effectually closing the entrance to the receptacle. The roller now runs through the concentric portion $x^3$ of the cam, holding the cut-off arms at the point attained by their first movement, in which position they hold open a clear path through the grain for the points of the compressor-arm P and the needle-arm Q, and also hold back the incoming grain from the packers, which continue working upon the grain behind the arm and help to effect a more perfect separation of the gavel in the receptacle from the grain held back by the arms. The binding mechanism should be started and the cut-off arm given its first upward movement when the packer-arms are at mid-stroke, the advancing arm being then about on a line with or slightly beyond the path traversed by the point of the cut-off, so that grain in front of it will not be engaged by the cut-off and drawn back. To effect this result, the two notches $m$ on the driving-pinion M are so located relatively to the wrist-pin of the crank $H^2$ that when one or the other of them is engaged by the starting-pawl $M^3$ on the binder-wheel the wrist-pin is at mid-stroke on either the highest or lowest live center of its revolution. If the cut-off arm should rise before the packer-arm has cleared its path, they would be acting oppositely upon the same grain, the packer to urge it into the receptacle and the cut-off arm to throw it back upon the platform with obviously undesirable results. The coincidence in the paths of the packer and cut-off arms will be clearly seen by a comparison of Figs. 11 and 34. It will further be noticed that when the cut-off arm has accomplished its initial movement it is in a position to hold back the incoming grain from the influence of the succeeding packer-arm, which will thus rise in cleared space behind or outside of the cut-off and act only upon grain already in the receptacle. The roller $o^5$ next runs up the gradually-inclined portion $x^4$ of the cam-track and raises the cut-off arms to the position shown in Fig. 35, in which position they are held during the remainder of the binding operation by the roller running through the concentric portion $x^5$ of the cam-track. When the roller passes through the quickly-receding portions $x^6$ of the cam-track to the pocket $x'$, the cut-off arms are rapidly dropped to their original positions below the receptacle-bars. The second upward or advance movement of the cut-off arms takes place simultaneously with the upward movement of the compressor-arm P from the point of intersection with it, as shown in Fig. 34, the arms moving away from each other at this point and effecting a wide and thorough separation or parting between the gavel in the receptacle and the incoming grain on the platform. The cut-off arms remain in their advanced position, Fig. 36, until the binding operation is completed and the needle and compressor arms on their return movements have receded past the throat of the receptacle, when they are suddenly dropped and the grain which has been accumulating against them during the binding operation allowed to pass into the receptacle. The cut-off arms O' O' are shorter and higher when they lie below the receptacle than the arm O, as shown by Figs. 7 and 10, being made in this way to enable them to clear the packer-arms when down and to hold the heads and butts of the grain farther back when they are raised to cut off.

The shaft $M^2$, which supports the binder-wheel, projects through its bearing $e^2$ on the standard E and has keyed to its rear end a crank plate or disk R, which might be called the "master-wheel" of the binder, for it not only imparts motion to the needle and compressing arms, but it also operates the knot-tying mechanism, before referred to as forming the subject-matter of another application, and such of the parts shown in these drawings as exclusively belong to or contribute toward the operation of the knotting mechanism will be found fully described and claimed in the said application.

Upon the rear face of the disk R is cast a wrist-pin $r$, upon which is mounted one end of a short link $r'$, its other end being connected to a stud $r^2$ on the front face of a lever R', loosely mounted on the front end of the compressor-shaft P', between two shorter arms $p$ $p'$, pinned fast to the shaft. The lever R' has an unvarying range of movement, while the compressor-arm P, which it actuates, encounters larger or smaller bundles in the receptacle, and is therefore made to stop or act with a yielding pressure when meeting with undue resistance, while the lever R' completes its movement. The latter communicates motion to the shaft P' through the spring $p^2$, which is wound several times around its hub, and has one of its ends bearing down upon a stud $r^3$ on the lever, the other bearing up against any one of a series of similar studs $p^3$ on the arm $p'$, fixed to the shaft. The spring is always under tension urging the shaft ahead of the lever R'; but its independent forward movement is limited by a stud $p^4$ on the arm $p$, which lies in a slot $r^4$ in the lever R', always bearing against its upper end unless the compressor-arm meets with a resistance greater than the power of the spring, when the stud will stop and fall back in the slot, while the lever completes its stroke. The force of the spring and the consequent pressure of the compressor-arm upon the bundle may be varied as the exigencies of the case require by changing the spring from one stud to another on the arm $p'$.

During that portion of the movement of the binder-wheel in which the cut-off arms are first or partially thrown up the lever R' and those parts of the binding mechanism receiving motion from it have no advance movement, but remain almost stationary. This is due to the fact that the wrist-pin $r$ at the beginning of the movement is back or outside of a center line drawn from the shaft $M^2$ to the stud $r^2$ on the lever to which the link $r'$ is attached, (see Fig. 10,) and that during the movement referred to the crank-pin merely crosses this line to the position shown in Fig. 33 at the same distance in advance of the line as it lay behind it at the beginning of the movement. This of course would not impart any appreciable motion to the lever, but it brings the wrist-pin $r$ close to the axis P' of the lever R' as it approaches and crosses a line drawn from said axis to the axis of the crank-disk R, the lever P', line $r^2$, and the link-line $r$ $r'$, forming an acute angle, so that the continued movement of the wrist-pin to the position shown in Fig. 34 will impart a very rapid motion to the lever and the compressor-arm. As the wrist-pin approaches the position shown in Fig. 35 the speed it imparts to the lever is greatly reduced; but its action thereon becomes much more powerful. The compressor-arm at first advances very rapidly, gathering before it the loosely-packed grain in the receptacle; but as it approaches the limit of its movement the grain becomes highly compressed and offers greater resistance to the advancing arm. At this stage (see Fig. 35) the operation of tying the knot begins, during which the bundle is given an additional compression, the arm advancing to the position shown in dotted lines, while the wrist-pin is moving to its dotted position, in which it will be in line with the crank-axis $M^2$ and the stud $r^2$ on the lever, exerting a maximum of power on the lever while imparting to it a minimum of motion. When the position of the wrist-pin shown in Fig. 36 is reached, the binding operation is concluded and the compressor-arm is about to return to its starting position below the receptacle-bars.

As before stated, the cut-off and compressor-arms effect a wide separation between the incoming grain on the platform and the gavel in the receptacle. (See Figs. 34 and 35.) The needle-arm Q descends through the cleared space thus formed, and as the compressor-arm advances ahead of the needle, compressing the grain before it, the latter is relieved from all strains or heavy work and is free to perform its only function, that of placing the binding-cord around the bundle and accurately presenting it to the knotting mechanism. The needle-arm is actuated by the lever R' through a link $R^2$, which connects the lever to a geared sector or crank arm $Q^2$, keyed fast to the needle-shaft Q'. This link is mounted upon studs $r^5$ and $q$, cast upon the rear faces of the lever and sector-arm, respectively. The needle-arm Q and the compressor-arm P', being driven by the same agency—viz., the lever R'—correspond in their movements as to time and speed of action, except that the needle has no movement when the compressor is exerting its final effort on the bundle. This is due to the fact that the shaft P' and the connections $q$ and $r^5$ of the link $R^2$ are nearly on a dead central line and that during this final advance movement of the lever the stud $r^5$, to which the link is connected, merely plays across this line without affecting the position of the sector-arm on the needle-arm shaft. (See Figs. 35 and 36.)

The sector-arm $Q^2$, to which the link is connected, is provided on its periphery with a segmental geared rack $q^2$, which at the proper moment engages a mutilated pinion on the retainer-arm shaft S', imparting to it a half-revolution and causing the retainer to act as an ejector and discharge the bound bundle from the binding-receptacle. The retainer-arm S is mounted upon the rear end of its shaft S' and stands in a plane at the rear of the needle-arm. The grain is packed into the receptacle against the retaining-arm, which by a slight movement assists in the final compression of the bundle when the knot is being tied, and finally by its half-revolution ejects the bound bundle from the receptacle. The arm is mounted at its center upon the rear end of the shaft S', and is bifurcated at each of its ends to form diverging prongs, $s$ $s$ being the retainer-prongs and $s'$ $s'$ the ejectors. The front end of the shaft S' extends through its bearing in the standard E and carries a double-crank arm or lever T, each end of which is provided with an anti-friction roller $t$, which bears upon the edge of a cam plate or disk T'. This disk is mounted upon the shaft $M^2$ between the binder-wheel and the standard E, and controls the retainer-arm during a greater portion of the binding operation, but releases it when it is given its final half-revolution to eject the bundle from the receptacle. Keyed fast to the shaft S', immediately back of the standard E, is a sleeve or hub $S^2$, having upon one end the mutilated pinion $s^2$ and at the other a diamond-shaped flange or cam $s^3$. A flat spring $S^3$, fastened to the standard E, bears at its free end upon the inner point of the diamond, and, holding the arm T in contact with the cam T', prevents the lower end of the retainer-arm from accidentally swinging into the binding-receptacle when it is empty, as between the ejection of one bundle and the incoming grain to form the next one. The spring extends over the outer point of the diamond far enough to insure its being lifted, as that point sweeps under it when the shaft is revolved. As before stated, the sector-arm $Q^2$ on the needle-shaft has a gear-rack on its edge which engages the teeth of the mutilated pinion $s^2$ on the retainer-shaft when the needle-arm is rising from the receptacle after the bundle is bound, and imparts a half-revolution to the retaining-arm, causing it to eject the bound bundle from the receptacle. Normally the teeth of the pinion are held out of the path of those on the sector (in the positions shown in Figs. 10, 33, 34, and 35) by the lever T, resting upon the cam T'; but at the proper time when the needle-arm is rising the lever is released from the cam and the retainer-arm forced by the expansion of the bundle to the position shown by dotted lines in Fig. 36, bringing the first tooth of the pinion into the first space in the sector-rack, so that the continued movement of the rack compels the further rotation of the pinion and retainer-arm.

The retainer-arm is made double-ended in order that its work may be quickly performed during its half-revolution and that no time may be lost between the completion and ejection of one bundle and the opening of the binding-receptacle to the incoming grain for the next. This of course requires duplication of all the parts mounted on the shaft S' which control or operate the retainer-arm, the pinion $s^2$ having two sets of teeth, the diamond cam $s^3$ two points or surfaces operated upon by its holding-spring, and the lever T two ends of which contact with the cam T'. The retainer-arm of course might be made single-ended and be given a full revolution for each bundle ejected, but this would necessitate high speed of the arm or a loss of time, and, while it might possess some advantages over that shown, I prefer the double-ended arm. There are three teeth and a spur in each set on the pinion, enough to give the retainer-shaft its full half-revolution while they are engaged by the sector-rack. In order that the teeth of the pinion may move quickly into engagement with the rack, the first tooth of a series on the pinion lies so close to the path of the rack that the upper portion of its inner face must be cut away to permit the rack to rise without moving the pinion when the needle-arm descends into the receptacle. During the greater portion of the binding operation the arm T rides upon the cam T' between the points $y'$ $y^2$, the retaining-arm remaining stationary and simply acting as the outer wall of the receptacle, against which the grain is packed and compressed. The knot is being formed while the wrist-pin advances from the position shown in Fig. 35 to that shown in Fig. 36. While the wrist-pin is advancing to the position shown by dotted lines in Fig. 35 the compressor-arm is completing its forward movement and is giving the bundle its final and greatest compression, being assisted in this operation by the retainer-arm, which at this stage also advances into the receptacle and compresses the bundle to its smallest limits, giving all possible slack of the binding-cord to the knotter. At the stage of the operation shown by said dotted lines the compressor-arm begins to recede, although the knot is only half formed, and, as it is essential that the bundle should remain under its greatest compression until the completion of the knot, I compensate for the premature retreat of the compressor-arm by the continued advance of the retainer-arm into the receptacle until it reaches the position shown by full lines in Fig. 36, at which state the knot is completed and the bundle ready to be ejected. The cam T' has an inclined or rising portion from $y^2$ to $y^3$, which passes under the arm T, lifting it to give the retainer-arm its inward movement. At the termination of this incline the cam is abruptly cut away and releases the arm T, permitting the expansion of the bundle to rock the retainer-arm to the dotted position shown in Fig. 36 and bring the teeth of the mutilated pinion into gear with those on the rack on the needle-shaft, the continued rotation of which imparts a half-revolution to the retainer-arm and causes it to eject the bundle, when all the parts resume their normal positions of rest. (Shown in Fig. 10.) The holding-spring $S^3$, bearing upon the inner point of the diamond cam, tends, like the expansion of the bundle, to rock the retainer-shaft until the mutilated pinion and rack are brought into engagement, and it may be relied upon to perform this office when the machine is being operated empty or without grain. The cam might be made separate from the mutilated pinion and adjustably secured upon the shaft to permit of variation in the time or point of action of the spring. If set as shown in Figs. 10 and 22, the spring would normally rest mainly upon its hub, only exerting pressure on the point to prevent backward rotation of the shaft. The cam $s^3$ might also be made as shown in Fig. 32, so that the spring, when the arm T is released by the cam T', will bear upon it at both sides of the shaft and hold it against accidental rotation in either direction when operating with an empty receptacle. A spring-finger U projects down into the receptacle near its front end and drags upon the butts of the grain therein, retarding or holding them back. This finger is supported by the bridge brace-rod $j$, being coiled several times around the front end of the rod and finally caught over the brace-rod $a^5$. The coils around the rod $j$ increase the resiliency of the finger. It will be noticed that the disposition of the parts is such as to throw almost the entire weight of the harvester upon the main or driving wheel, notwithstanding its peculiar location in front of the outer end of the platform.

The compact heavy binding mechanism located at the stubble end of the platform and outside of the driving-wheel nearly counterbalances the finger-beam and light-grain end of the platform, bringing its longitudinal center of balance about in line with the main wheel, while the weight of the driver, acting through the seat standard or lever upon the main frame at a point considerably in rear of the axle, places the actual load or weight of the machine upon the axle, while the lever, reaching back behind it, supports the machine near its transverse center of balance. This concentration of weight upon the driving-wheel is an important feature in a very light harvester, as it increases the traction and adds to the power of the wheel. It also relieves the grain-wheel of a considerable portion of the weight ordinarily imposed upon it, thereby of course lessening its work and diminishing the side draft of the machine, for the tread of these wheels is usually narrow, and when heavily loaded they will cut into soft or wet soil and seriously retard the grain end of the platform.

What I claim as new, and desire to secure by Letters Patent, is—

1. The combination of the main frame of the harvester, rectangular in shape and braced by a longitudinal bar which divides the frame into two compartments, the driving-wheel and its axle, which carries the frame, being located in the inner compartment, while the driving-shaft and the actuating mechanism of the binder are located in the outer one and supported by brackets secured to both the adjacent longitudinal bars of the frame, with a grain-platform rigidly connected at its outer front corner to the rear of the main frame, substantially as hereinbefore set forth.

2. The combination of the main frame of a harvester, located in front of the outer end of the platform and rigidly connected thereto, the outer side bar of the frame extending across the platform to the rear sill thereof, to which it is secured, with a binding-receptacle located substantially on the level of the platform at its outer end, and a truss-brace on the extension-bar below the plane of the bottom of the receptacle, substantially as hereinbefore set forth.

3. The combination of a harvester-platform, a binding mechanism located at its outer end having the binding-receptacle substantially on the level of the platform, a series of narrow carrier-belts extending along the platform and beneath the bottom of the receptacle, with a series of spring fingers or bars supported at their inner ends beneath the carrier-belts, between which they rise at an easy angle until they attain an altitude sufficiently above the belts to lift the grain therefrom, whence they proceed in a plane parallel with the upper surface of the belts to form the bottom of the receptacle, substantially as hereinbefore set forth.

4. The combination of a binding-receptacle, a grain-carrier consisting of a series of narrow belts which pass beneath the receptacle, with a series of spring fingers or bars which form the bottom of the receptacle and are supported at their inner ends below the carrier-belts through the spaces between which they rise, supports upon which the outer ends of the fingers may rest when pressed down by grain in the receptacle, but from which they spring up when the bound bundle is ejected therefrom, substantially as and for the purpose hereinbefore set forth.

5. A binding-receptacle the bottom of which is composed of a series of narrow steel or spring bars rigidly secured at their inner ends to a supporting-bar but left free at their outer ends, substantially as described.

6. The combination, in a harvester, of a binding-receptacle located substantially on the level of the platform and having an open slotted bottom inclining downwardly at the entrance of the receptacle, and a series of belts which pass through the slots in the inclined portion and beneath the bottom to a point well beyond the entrance, with a packing device whose field of operation in the entrance is between the receptacle and the point where the carrier-belts pass below the bottom bars, substantially as and for the purpose hereinbefore set forth.

7. The combination of the main frame of a harvester, rigidly connected to the front outer corner of the grain-platform and divided longitudinally by a brace-bar, with a supporting-frame for the binding mechanism consisting of the two standards D and E, spanning the outer compartment of the main frame, being securely bolted at their bottom to the side bars thereof and united at their tops by an overhanging arm F, which extends across the platform to the middle of the binding-receptacle thereon, substantially as and for the purpose hereinbefore set forth.

8. The combination of a frame to support the binding mechanism, composed of two standards D and E, rigidly secured at their bottoms to the main frame and united at their tops by a flat bar F, which extends with its edge uppermost to a point over the center of the binding-receptacle on the platform, with a brace-rod $a^5$, extending horizontally from the end of the arm F to the fixed reel-post $A^7$, and a brace-rod $a^6$, extending from the standard E to the reel-post, substantially as hereinbefore set forth.

9. The combination of a binder-frame arm overhanging the binding-receptacle, a bar J, supported thereby and extending inwardly above the receptacle to form its top, a brace-rod $a^5$ from the overhanging arm to a fixed post on the harvester-frame, with a brace-rod $j$, extending from the inner end of the bar J and intersecting the brace $a^5$, substantially as hereinbefore set forth.

10. The combination of an overhanging binder-frame arm F, a breast or top-receptacle bar J, attached thereto and extending inwardly above the binding-receptacle, with a companion breast-bar J', extending parallel to the bar J and supported by it through a tubular bridge-piece $J^2$, and a bolt and spacing-thimble $j\,j'$ at their inner ends, a space being left between the two bars through which the several operating-arms of the binding mechanism pass in the binding operation, substantially as hereinbefore set forth.

11. The combination of an overhanging binder-frame arm, a breast-frame which forms the top of the receptacle supported thereby, a brace-rod $A^7$, extending from the overhanging arm to a fixed post $A^7$, with the brace-rod $j$, which unites the inner ends of the bars composing the breast-frame, and extending thence to the rod $a^5$, to which it is securely fastened, substantially as and for the purpose hereinbefore set forth.

12. In a grain-binder, the combination of a crank-shaft H and the pinion M, mounted thereon, with the binding mechanism, the master-wheel M' of which gears into and is intermittingly driven by the pinion M, substantially as hereinbefore set forth.

13. The combination, in a grain-binder, of the gear-wheel $b$, the counter-shaft $B^2$, with the pinion $b'$ and the gear-wheel $b^2$ mounted thereon, the pinion $b^3$, and the crank-shaft H, with the pinion M fixed thereon, all arranged and jointly operating to transmit motion directly from the driving-wheel to the master-wheel M' of the binding mechanism, substantially as set forth.

14. In a grain-binder, the combination of the binding mechanism, the platform-carrier belts, the reciprocating packer-arms, and the vibrating sway-bar, with the constantly-revolving shaft H, by which all these elements are directly operated, substantially as hereinbefore set forth.

15. The combination, in a platform-binder, of a binding-receptacle located on the platform, carrier-belts which are driven by rollers beneath the receptacle, with packing devices located between the upper and lower surfaces of the belts and projecting through the spaces between them and into the entrance of the receptacle when operating on the grain, substantially as hereinbefore set forth.

16. The combination, in a grain-binder, of a binding-receptacle located practically on the level of the platform, and packing devices to force the grain into the receptacle, with carrier-belts running past the packers and well into the receptacle, substantially as hereinbefore set forth.

17. The combination of a bracket bolted to the platform, a double knuckle-joint pivoted to the bracket, a packer-arm pivoted to the knuckle-joint and provided at its free end with an upturned projection or finger which operates directly on the grain, with a reciprocating sway-bar to which the packer-arm is connected by a pitman, and by which it is vibrated back and forth, substantially as hereinbefore set forth.

18. The combination of a bracket bolted to the platform, a double knuckle-joint pivoted to the bracket, a packer-arm pivoted to the knuckle-joint and provided at its free end with an upturned projection or finger which operates directly on the grain, the knuckle-joint having a downwardly-projecting arm to which is pivoted a bar, the reciprocations of which elevate or depress the fingers on the free end of the packer-arm, substantially as hereinbefore set forth.

19. The combination of two packer-arms pivoted to double knuckle-joints on the front and rear sills of the platform, said knuckles having downwardly-projecting arms which are united by a bar extending across the platform, with a pivoted lever connected to said bar and operated at its free end by a cam-roller on the driving-shaft, substantially as hereinbefore set forth.

20. The combination of the packer-arms pivoted to double knuckle-joints supported from the front and rear sills of the platform, the packer-arms being connected to the sway-bar upon either side of its center and are oppositely reciprocated thereby, with a link or bar which connects the depending arms of the knuckle-joints and is reciprocated longitudinally by a lever and cam on the driving-shaft to quickly elevate and depress the points of the packer-arm into or from the stream of grain, the action of the cam being so timed that the packer-arms rise or fall at each extremity of the stroke of the sway-bar, substantially as hereinbefore set forth.

21. The combination of a packer-arm mounted upon a double joint, a recess or socket being formed in the arm, and a similarly-recessed cap to cover said socket and inclose the ball on one end of its driving-pitman, the other end of the pitman being connected to the sway-bar by a soft-rubber sleeve-joint which will yield to give it freedom of motion, substantially as described.

22. The combination of a binding-receptacle located on the platform, carrier-belts which extend beneath the receptacle, reciprocating packing devices lying beneath the receptacle and between the upper and lower surfaces of the belts, with a centrally-pivoted sway-bar also between the upper and lower surfaces of the belts and connected to the packer-arms by pitmen, through which it imparts to them a reciprocating motion, substantially as hereinbefore set forth.

23. The combination of a centrally-pivoted sway-bar extending transversely across the platform, a cutter-bar connected to the sway-bar and reciprocated thereby, and packing devices located beneath the binding-receptacle, also connected to and reciprocated by the sway-bar, substantially as hereinbefore set forth.

24. The combination of a binding-receptacle located on the platform at its outer end and having a contracted throat or entrance, constantly-moving carrier-belts which pass beneath the receptacle, bars which constitute the bottom of the receptacle extending horizontally above the belts to its throat and then inclining at an easy angle to a point below the belts, the inclined portion crossing the plane of the top of the belts and lifting the incoming grain therefrom, with packing devices located beneath the entrance of the receptacle and seizing the grain deposited upon the bars by the belts, urging it into the receptacle, substantially as hereinbefore set forth.

25. In a grain-binder, the combination of a binding-receptacle, alternately-reciprocating packers working in the entrance to the receptacle, cut-off arms to close said entrance, with a cam in the binding mechanism to operate the cut-off, and so timed relatively to the packers that it raises the arms across the entrance when the packers are at mid-stroke, substantially as and for the purpose hereinbefore set forth.

26. The combination of a binding-receptacle having a contracted throat or entrance, a broad cut-off arm which is pivoted below the throat, swings outwardly, and crosses said throat to stop the incoming stream of grain and open a path therethrough, with a compressor-arm pivoted below the receptacle and on the grain side thereof, its points when rising crossing the throat through the path held open by the cut-off arm, substantially as hereinbefore set forth.

27. The combination of a binding-receptacle located on the platform and having a contracted throat or entrance, a broad cut-off arm pivoted below said throat and rising across it and swinging outwardly to stop the incoming stream of grain and open a path therethrough, an inwardly-swinging compressor-arm pivoted below the receptacle, its point rising across the throat through the path opened by the cut-off arm, which it materially widens, a needle-arm pivoted above the receptacle, its point descending across the throat through the path opened by the cut-off, and compressor-arms, with means, substantially as described, for actuating the several arms and imparting to them at the proper times the motions above described, substantially as hereinbefore set forth.

28. The combination of a binding-receptacle located on the platform and having a contracted throat or entrance, with a cut-off arm pivoted below the receptacle and extending outwardly, and a compressor-arm pivoted beneath the receptacle and extending inwardly, the points of the two arms passing or lapping each other just below the throat, through which they rise, the paths of their points intersecting at a point above the throat, from which they diverge to effect a wide separation of the gavel from the grain on the platform, with means, substantially as described, for actuating them, substantially as hereinbefore set forth.

29. The combination of a binding-receptacle located on the platform and having a contracted throat or entrance, a cut-off arm pivoted beneath the receptacle and extending outwardly, a compressor-arm also pivoted beneath the receptacle and extending inwardly, its point lapping past the point of the cut-off arm, a crank on the binder mechanism, with suitable connections to raise the compressor-arm across the throat and into the receptacle, with a cam, also on the binder mechanism, operating through suitable connections to raise the cut-off arm across the throat and away from the receptacle, said cam being so timed relatively to the movement of the compressor-crank and its track so shaped that it raises the cut-off to close the throat before the compressor enters it, then holds the cut-off still until the point of the compressor has crossed the throat through the path held open, then again actuating the cut-off so that it moves simultaneously with but in the opposite direction from the compressor, substantially as and for the purpose hereinbefore set forth.

30. The combination of cut-off arms mounted on a shaft extending across the platform beneath the throat or entrance to the binding-receptacle and operated, through a stud-roller $o^5$ and suitable mechanism, substantially as hereinbefore described, by a cam-groove on the binder-wheel, said groove being divergent from its initial point $x'$ to $x^2$, so that its movement first elevates the cut-off arms to a position across the throat, then concentric at $x^3$ to hold the arms for a moment in this position, and then again divergent at $x^4$ to rock the arms forward to their most advanced position, where it holds them until the completion of the binding operation, and finally convergent at $x^6$ into the starting-point or pocket $x'$ to rapidly return the arms to their normal position beneath the binding-receptacle, substantially as described.

31. The combination of a compressor-arm P, pivoted below the binding-receptacle on a rock-shaft P', a crank-arm R', mounted on the compressor-shaft and connected by a link $r'$ to the wrist-pin of a crank-plate R, said wrist-pin in its position of rest being located back of a central line drawn from the binder-shaft to the link-connection with the lever R', so that the first portion of the movement of the wrist-pin will impart no appreciable movement to the compressor-arm, substantially as hereinbefore set forth.

32. The combination of a cut-off arm pivoted below the throat or entrance to the binding-receptacle and operated, through a stud-roller $o^5$ and suitable mechanisms, by a cam-track on the binder-wheel, the divergent initial portion $x'$ to $x^2$ of which on the first movement of the wheel rapidly raises the cut-off arms to a position across the throat, where they check the incoming stream of grain and open a path therethrough, with a compressor-arm pivoted beneath the receptacle, a crank-arm on the compressor-shaft connected by a link to the wrist-pin of a crank-plate on the binder-shaft, the wrist-pin in its position of rest being back of a center line drawn from the binder-shaft to the pitman-connection with the crank-arm, so that during that portion of the movement of the binder-wheel by which the cut-off arms are raised across the throat practically no motion will be imparted to the compressor-arms by the wrist-pin, substantially as hereinbefore set forth.

33. The combination of a cut-off arm mounted on a rock-shaft below the throat or entrance to the binding-receptacle and operated, through a stud-roller $o^5$ and suitable connecting mechanism, by a cam on the binder-wheel, the divergent initial portion $x'$ to $x^2$ of which raises the cut-off arm across the throat to close it and open a path through the grain therein, the concentric portion $x^3$ holding it momentarily in this position, the divergent portion $x^4$ then rocking it (the cut-off arm) forward to its most advanced position, with a compressor-arm pivoted beneath the receptacle on a rock-shaft, a crank-arm mounted on the compressor-shaft and connected by a link $r'$ to the wrist-pin of a crank-plate on the binder-shaft, said wrist-pin in its position of rest being so located back of the dead-center line of the link $r'$ that during that portion of the movement of the binder-wheel in which the cut-off arms are raised across the throat it will impart no motion to the compressor-arm, but will rapidly elevate it (the compressor-arm) through the path opened by the cut-off arm while the latter stands in its temporary position across the throat and continue to swing it outwardly, while the cut-off arm swings inwardly, the divergent motion of the two arms effecting a wide separation or parting in the stream of grain, substantially as hereinbefore set forth.

34. The combination of a compressor-arm mounted on a rock-shaft P', and a crank-arm R', mounted on the compressor-shaft and connected by a link $r'$ to the wrist-pin $r$ of a crank-plate on the binder-shaft, the wrist-pin being normally located back of the dead-center line of the link $r'$ and its path lying close to the shaft P', the relative location and arrangement of all these parts being such that the first part of the movement of the wrist-pin imparts no motion to the compressor-arm, but its continued movement raises it (the arm) very rapidly to its highest point, when the wrist-pin again crosses the dead-center line of the link $r^2$ and exerts its greatest power on the compressor-arm, substantially as hereinbefore set forth.

35. The combination of a compressor-arm mounted on a rock-shaft below the binding-receptacle, a crank arm or lever R', mounted on the compressor-shaft and connected by a link $r'$ to the wrist-pin of a crank-plate, with a needle-arm mounted on a rock-shaft above the binding-receptacle, and a crank-arm $Q^2$ on the needle-arm shaft connected by a link $R^2$ to the crank-arm R' on the compressor-shaft, substantially as hereinbefore set forth.

36. The combination of a compressor-arm mounted on a rock-shaft P' below the binding-receptacle, a crank-arm R', mounted on the compressor-shaft and connected by a link $r'$ to the wrist-pin of a crank-plate, a needle-arm pivoted above the receptacle, a crank-arm $Q^2$ on the needle-shaft connected by a link $R^2$ with the crank-arm $R'$ on the compressor-shaft, the compressor-arm lying nearer to the binding-receptacle than the needle and moving into it in advance of the needle, substantially as hereinbefore set forth.

37. The combination of a compressor-arm pivoted on a rock-shaft $P'$ below the binding-receptacle, a crank-arm $R'$, mounted on the compressor-shaft, a needle-arm pivoted on a rock-shaft above the receptacle, and a crank-arm $Q^2$ on the needle-shaft connected by a link $R^2$ to the crank-arm $R'$, the connecting-point of the link to the crank-arm $R'$ crossing and recrossing a line drawn from the compressor-shaft through the link-connection to the crank-arm $Q^2$, so that when the needle is down the crank $Q^2$ imparts no appreciable movement to its arm during the completion of the advance and the beginning of the retreating movement of the compressor, substantially as hereinbefore set forth.

38. The combination of a compressor-arm secured upon a rock-shaft, a crank-arm $R'$, loosely mounted on the rock-shaft and connected by a link to the wrist-pin of a crank $R$, with a crank-arm $p'$, secured to the compressor-shaft and actuated by the loose crank-arm $R'$ through a spring $p^2$, substantially as hereinbefore set forth.

39. The combination of a compressor-arm secured upon a rock-shaft, a crank-arm $R'$, loosely mounted upon the shaft between two arms $p$ $p'$, secured to the shaft, the arm $R'$, provided with a slot in which a stud projection on the arm $p$ lies, and a projecting pin over which one end of a spring $p^2$, coiled around the shaft, is caught, the other end of the spring being caught under any one of the series of pins on the fixed arm $p'$, substantially as hereinbefore set forth.

40. The combination of a retainer and ejector arm mounted on a shaft, means for imparting to it a half-revolution for each actuation of the binding mechanism, with a cam also mounted on the shaft, and a spring acting on said cam, substantially in the manner and for the purpose hereinbefore set forth.

41. The combination of a needle-arm and a segmental gear-rack mounted on a rock-shaft above the binding-receptacle, with a retainer-arm, a mutilated pinion and a lever-arm also mounted on a shaft above the receptacle, the lever trailing upon the periphery of a cam-plate on the binder-shaft to maintain the retainer-arm in its working position and hold the teeth of the pinion out of engagement with the rack when the binder-arm descends, the cam-disk being cut away to free the trailing lever and allow the pinion to roll into the path of the rack before the needle begins its upward movement, substantially as hereinbefore set forth.

42. The combination of a binding-receptacle and a fixed frame forming its top, with a spring-finger attached to the frame and extending down into the receptacle to trail over the butt-ends of the bundles and retard them, substantially as hereinbefore set forth.

In testimony whereof I affix my signature in presence of two witnesses.

JOHN S. DAVIS.

Witnesses:
CARRIE T. SOUTHARD,
IDA M. SUMNER.